(12) United States Patent
Watanabe

(10) Patent No.: US 8,469,811 B2
(45) Date of Patent: Jun. 25, 2013

(54) INFORMATION PROCESSING APPARATUS AND STORAGE MEDIUM HAVING INFORMATION PROCESSING PROGRAM STORED THEREON

(75) Inventor: Ken Watanabe, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 1341 days.

(21) Appl. No.: 11/523,018

(22) Filed: Sep. 19, 2006

(65) Prior Publication Data

US 2007/0266181 A1   Nov. 15, 2007

(30) Foreign Application Priority Data

Mar. 28, 2006 (JP) .................. 2006-088741

(51) Int. Cl.
- A63F 9/24 (2006.01)
- A63F 13/00 (2006.01)
- G06F 17/00 (2006.01)
- G06F 19/00 (2006.01)

(52) U.S. Cl.
USPC .......................................... 463/37

(58) Field of Classification Search
USPC ...................... 463/36, 37, 47, 47.2
See application file for complete search history.

(56) References Cited

U.S. PATENT DOCUMENTS

| | | | |
|---|---|---|---|
| 5,602,566 A * | 2/1997 | Motosyuku et al. | 345/684 |
| 6,567,071 B1 * | 5/2003 | Curran et al. | 345/158 |
| 7,796,116 B2 * | 9/2010 | Salsman et al. | 345/158 |

FOREIGN PATENT DOCUMENTS

| | | |
|---|---|---|
| JP | 6-308879 | 11/1994 |
| JP | 07-64754 | 3/1995 |
| JP | 07-302148 | 11/1995 |
| JP | 8-71252 | 3/1996 |
| JP | 11-110106 | 4/1999 |

OTHER PUBLICATIONS

Hexic, http://zone.msn.com/en/hexic/default.htm, Created Nov. 27, 2003.*
Hexic HD, http://xbox360.ign.com/articles/668/668856p1.html, Created Nov. 21, 2005.*
Rubik's Cube Java Applet, http://www.schubart.net/rc/, Created Dec. 27, 1995.*

* cited by examiner

Primary Examiner — David L Lewis
Assistant Examiner — Reginald Renwick
(74) Attorney, Agent, or Firm — Nixon & Vanderhye P.C.

(57) ABSTRACT

An information processing apparatus calculates or obtains inclination data which changes in accordance with the inclination of an input device, from the operation data obtained from the input device. The operation data includes at least one of data on a taken image taken by the imaging means, data representing predetermined two positions in the imaging target in the taken image, data representing a direction connecting the two positions, and inclination data representing an inclination of the input device which is calculated based on the direction. The information processing apparatus replaces an object (panel, etc.) displayed on a screen with another object based on the inclination data and displays the replacement result.

18 Claims, 25 Drawing Sheets

Fig. 26

| CHARACTER | MARCHING PROCESSION | WEAPON | PROTECTING TOOL |
|---|---|---|---|
| CHARACTER A | 1 | SWORD | ARMOR |
| CHARACTER B | 2 | SPEAR | ARMOR |
| CHARACTER C | 3 | AX | SHIELD |
| CHARACTER D | 4 | STICK | CLOTHES |

Fig. 27

| CHARACTER | MARCHING PROCESSION | WEAPON | PROTECTING TOOL |
|---|---|---|---|
| CHARACTER A | 3 | SWORD | ARMOR |
| CHARACTER B | 2 | SPEAR | ARMOR |
| CHARACTER C | 1 | AX | SHIELD |
| CHARACTER D | 4 | STICK | CLOTHES |

…

INFORMATION PROCESSING APPARATUS AND STORAGE MEDIUM HAVING INFORMATION PROCESSING PROGRAM STORED THEREON

CROSS REFERENCE TO RELATED APPLICATION

The disclosure of Japanese Patent Application No. 2006-088741, filed on 28 Mar. 2006 is incorporated herein by reference.

BACKGROUND OF THE INVENTION

1. Field of the Invention

The present invention relates to an information processing apparatus and program, and more particularly to an information processing apparatus and program operable by a user using an input device including an imaging device.

2. Description of the Background Art

Conventionally, technologies for designating a specific position on a display screen using an optical pointing system have been proposed. For example, an optical pointing system described in Japanese Laid-Open Patent Publication No. 6-308879 is used for conferences or the like held for a plurality of viewers. According to this system, a light emitting element is provided in the vicinity of the display screen, and an imaging device using an optic/electric conversion element is built in an indicator. The user can designate an arbitrary position on the display screen using the indicator as follows. The indicator takes an image of the light emitting element by the imaging device and the position designated by the user is calculated based on the obtained image. A mark is displayed at the calculated position, and thus the designated position is indicated with the mark.

A game controller which uses an optical pointing system substantially the same as the above has been proposed (see, for example, Japanese Laid-Open Patent Publication No. 8-71252). The controller has a shape of a gun and is used for a shooting game. The shooting game is for shooting a target displayed on the screen with a gun. The gun is used for designating an arbitrary position (which the bullet is to hit) on the screen. The gun-shaped controller has a built-in CCD camera, and light emitting elements located at four positions around the screen are imaged by the CCD camera. The controller calculates the rotation angle or the inclining angle of the gun using the obtained images. The controller uses the calculation result to detect whether or not the gun is correctly directed toward the target displayed on the screen, and thus determines whether or not the bullet has hit the target. With such a structure, a game system by which the player performs a game operation by moving the controller (gun) held in his/her hand can be realized.

With the above-described technologies, the input device held in the user's hand (the indicator or the gun-shaped controller) is only used for designating a position on the display screen. Namely, the above-described indicator or gun-shaped controller allows the player to perform only one operation of designating a position on the display screen but not any other operation. For example, when used for a game apparatus, such an input device allows the player to perform only one simple game operation of designating a position on the display screen. Since the game operation is quite simple, the game itself is simple and is not entertaining.

SUMMARY OF THE INVENTION

Therefore, an object of the present invention is to provide an information processing apparatus allowing the user to perform a new type of operation using a hand-held input device and a program executable by such an information processing apparatus.

The present invention has the following features to attain the object mentioned above. The reference numerals, additional explanations and the like in parentheses in this section of the specification indicate the correspondence with the embodiments described later for easier understanding of the present invention and do not limit the present invention in any way.

A first aspect of the present invention is directed to an information processing apparatus (game apparatus 3) for obtaining operation data (62) from an input device (controller 7), including imaging means (imaging element 40) for taking an image of an imaging target (markers 8a and 8b), and displaying a result of game processing executed in accordance with the operation data on a screen of a display device (monitor 2). The operation data includes at least one of data on a taken image taken by the imaging means, data representing predetermined two positions in the imaging target in the taken image (marker coordinate set data 621), data representing a direction connecting the two positions, and inclination data representing an inclination of the input device which is calculated based on the direction. The information processing apparatus comprises inclination data calculation means (CPU 10 or the like for executing S22, S39, or S57; hereinafter, only the step number of the corresponding processing will be described in this section of the specification) and replacement means (S25 and S26, S40, or S58). The inclination data calculation means calculates or obtains the inclination data (636) representing the inclination of the input device from the operation data obtained from the input device. The replacement means replaces an object (panel 51, candidate letter images 73a through 73e, cells in the table 76, or windows 81a through 81d) displayed on the screen with another object based on the inclination data and displays the replacement result.

In a second aspect of the present invention, the replacement means may replace positions of a plurality of objects displayable on the screen.

In a third aspect of the present invention, the operation data may include at least one of the data on the taken image taken by the imaging means, the data representing the predetermined two positions in the imaging target in the taken image (marker coordinate set data 621), and data representing a position of the imaging target in the taken image. In this case, the information processing apparatus further comprises indicated position calculation means (S11, S34 or S52) and selection means (S12 and S13, S35 and S37, or S53 and S54). The indicated position calculation means calculates an indicated position on the screen indicated by the input device from the operation data. The selection means selects a plurality of target objects as replacement targets from the plurality of objects displayable on the screen using the indicated position. The replacement means replaces positions of the plurality of target objects.

In a fourth aspect of the present invention, the selection means may select a plurality of objects included in a predetermined area (area surrounded by the frame 53) including the indicated position as the target objects.

In a fifth aspect of the present invention, a plurality of object group images (candidate letter group images 71a through 71e) representing an object group including a plurality of objects may be displayed on the screen. In this case, the selection means determines whether or not one of the plurality of object group images overlaps the indicated position at a predetermined timing (at the timing when the candidate letter determination button is pressed), and selects the plurality of objects (candidate letter images 73*a* through 73*e*) corresponding to the object group image overlapping the indicated position as the target objects.

In a sixth aspect of the present invention, the selection means may determine whether or not one of the plurality of objects (cells in the table 76) displayed on the screen overlaps the indicated position at a predetermined timing (at the timing when the selection button is pressed), and select the object overlapping the indicated position as the target object. In this case, when a plurality of objects are selected as the target objects, the replacement means replaces positions of the target objects.

In a seventh aspect of the present invention, the replacement means may replace the positions of the plurality of objects (target panels) by rotating the plurality of objects around an axis at a center of display positions thereof (mark 54).

In an eighth aspect of the present invention, the replacement means may replace the objects based on a change in the inclination of the input device represented by the inclination data during a predetermined time period (from when the game state was set to the replaceable state until the current time).

In a ninth aspect of the present invention, the input device may include at least one operation key which can be pressed (operation keys 32*a* through 32*i*). In this case, the operation data further includes key data which indicates whether or not the operation key is pressed (operation key data 622). The replacement means determines the predetermined time period based on the key data.

In a tenth aspect of the present invention, the replacement means may replace the positions of the plurality of objects in a circulating manner. In this case, the replacement by the replacement means is executed by a number of times corresponding to a change amount in the inclination during the predetermined time period.

In an eleventh aspect of the present invention, the replacement means may replace the objects based on a change in the inclination which is represented by the inclination data with respect to a predetermined reference direction.

A twelfth aspect of the present invention is directed to a game apparatus (3) for obtaining operation data (62) from an input device (controller 7), including imaging means (imaging element 40) for taking an image of an imaging target (markers 8*a* and 8*b*) and at least one operation key which can be pressed (operation keys 32*a* through 32*i*), and executing game processing executed in accordance with the operation data. The operation data includes first data (marker coordinate set data 621), which is at least one of data on a taken image taken by the imaging means, data representing predetermined two positions in the imaging target in the taken image, data representing a vector connecting the two positions, and inclination data representing an inclination of the input device which is calculated based on the vector, and second data (operation key data 622) which indicates whether or not the operation key is pressed. The game apparatus comprises operation data obtaining means (S3), inclination calculation means (S15 and S22), indicated position calculation means (S11), key input determination means (S14 and S21), operation target setting means (S12 and S13), storage means (S15), change amount calculation means (S23), rotation means (S25), approximation means (S26), replacement means (S28), deletion means (S18), and display control means (S28). The operation data obtaining means sequentially obtains the operation data. The inclination calculation means sequentially calculates or obtains the inclination of the input device from the first data included in the operation data. The indicated position calculation means sequentially calculates an indicated position on a screen indicated by the input device from the first data included in the operation data. The key input determination means determines whether or not the operation key is pressed based on the second data included in the operation data. The operation target setting means sets, as operation targets (target panels), puzzle elements located in a predetermined area (area in the frame 53) including a position in a game space corresponding to the indicated position at the timing when the operation key is pressed, among a plurality of puzzle elements (panels) located in the game space and classified into a plurality of types. The storage means stores the inclination of the input device at the timing when the operation key is pressed. The change amount calculation means sequentially calculates a change amount in the inclination, calculated by the inclination calculation means, with respect to the inclination stored on the storage means while the operation is pressed. The rotation means rotates the puzzle elements as the operation targets by a rotation amount obtained based on the change amount. The approximation means approximates the change amount at the timing when the operation key is released to a rotation amount when positions of the puzzle elements as the operation targets are replaced in a circulating manner. The replacement means replaces the positions of the puzzle elements as the operation targets in a circulating manner by rotating the puzzle elements by the approximated rotation amount. The deletion means, when at least a predetermined number of puzzle elements classified into an identical group are arranged in a line in the game space as a result of the positions of the puzzle elements being replaced by the replacement means, deletes the puzzle elements arranged in the line. The display control means sequentially causes a display device to sequentially display an image of the game space including the puzzle elements.

A thirteenth aspect of the present invention is directed to a letter input acceptance apparatus (game apparatus 3) for obtaining operation data (62) from an input device (controller 7), including imaging means (imaging element 40) for taking an image of an imaging target (markers 8*a* and 8*b*), a first operation key and a second operation key, and accepting a letter input in accordance with the operation data. The operation data includes first data (marker coordinate set data 621), which is at least one of data on a taken image taken by the imaging means, data representing predetermined two positions in the imaging target in the taken image, data representing a vector connecting the two positions, and inclination data representing an inclination of the input device which is calculated based on the vector, and second data (operation key data 622) which indicates whether or not the operation key is pressed. The letter input acceptance apparatus comprises operation data obtaining means (S33), inclination calculation means (S39), indicated position calculation means (S34), key input determination means (S36 and S38), first display control means (S42), second display control means (S42), replacement means (S40), input acceptance means (S41), and third display control means (S42). The operation data obtaining means sequentially obtains the operation data. The inclination calculation means sequentially calculates or obtains the inclination of the input device from the first data included in the operation data. The indicated position calculation means sequentially calculates an indicated position on a screen indicated by the input device from the first data included in the operation data. The key input determination means determines whether or not the operation key is pressed based on the second data included in the operation data. The first display control means causes a display device to display a plurality of letter group images (candidate letter group images 71a through 71e) representing a letter group including a plurality of letters. The second display control means causes the display device to display a plurality of letter images (candidate letter images 73a through 73e) each representing a letter included in the letter group represented by the letter group image which overlaps the indicated position at the timing when the first operation key is pressed, such that the plurality of letter images have a predetermined positional relationship. The replacement means replaces positions of the plurality of letter images based on the inclination calculated by the inclination calculation means. The input acceptance means, when the second operation key is pressed, accepts an input of a letter represented by the letter image displayed at a predetermined position among the plurality of letter images. The third display control means causes the display device to display the letter accepted by the input acceptance means.

The present invention may be provided in the form of a computer-readable storage medium having a program causing a computer of an information processing apparatus to execute the above-described functions.

According to the first aspect, the inclination data calculation means calculates inclination data which changes in accordance with the inclination of the input device, and the replacement means replaces the objects based on the calculated inclination data. Owing to this, the user can replace the objects by changing the inclination of the input device. Namely, the present invention provides the user with a novel operation of replacing the objects by rotating the input device itself.

According to the second aspect, a novel operation of replacing a plurality of objects by rotating the input device itself is provided.

According to the third aspect, a target object as the replacement target is selected based on the indicated position calculated by the indicated position calculation means. Owing to this, the user can select the object to be the replacement target, as well as replacing the objects, using the input device. The user can perform two different operations by changing the manner of handling the input device. Thus, the third aspect of the present invention allows the player to perform two different operations by simple handling of the controller, and provides an easy-to-operate information processing apparatus to the player.

According to the fourth aspect, the objects located in a predetermined area including the indicated position are set as replacement targets. Therefore, the objects to be the replacement targets can be intuitively and thus easily selected.

According to the fifth aspect, in the case where the indicated position is located at the position of an object group image at a predetermined timing, a plurality of objects corresponding to the object group image are set as the replacement targets. Owing to this, the user can easily select the objects to be the replacement targets by intuitively designating the object group image which represents an object group desired to be the replacement targets.

According to the sixth aspect, an object overlapping the indicated position at a predetermined timing is set as the replacement target. Owing to this, the objects to be the replacement targets can be selected one by one. Therefore, the objects can be replaced more freely. The user can intuitively and thus easily select the objects to be the replacement targets.

According to the seventh aspect, the objects to be the replacement targets are rotated. Thus, how the replacement is executed can be presented to the user in an easy-to-see manner.

According to the eighth aspect, the objects can be replaced based on the relative change in the inclination of the input device.

According to the ninth aspect, the user can determine the predetermined period himself/herself using the operation key. Therefore, the user can replace the objects more easily.

According to the tenth aspect, the number of cycles of replacement executed is varied in accordance with the change amount. Therefore, the user can perform a plurality of cycles of replacement easily.

According to the eleventh aspect, the objects can be replaced based on the absolute inclination of the input device.

According to the twelfth aspect, a novel, intuitively operable puzzle game is provided, in which the puzzle elements to be the replacement targets are designated by moving the indicated position by the input device and the puzzle elements are replaced by rotating the input device.

According to the thirteenth aspect, a novel, intuitively operable puzzle game is provided, in which the letter group to be the replacement target is designated by moving the indicated position by the input device and the letter to be input is determined by rotating the input device.

These and other objects, features, aspects and advantages of the present invention will become more apparent from the following detailed description of the present invention when taken in conjunction with the accompanying drawings.

BRIEF DESCRIPTION OF THE DRAWINGS

FIG. 26 shows an exemplary game image in a second modified example;

FIG. 27 shows another exemplary game image in the second modified example;

DESCRIPTION OF THE PREFERRED EMBODIMENTS

Figure 1:
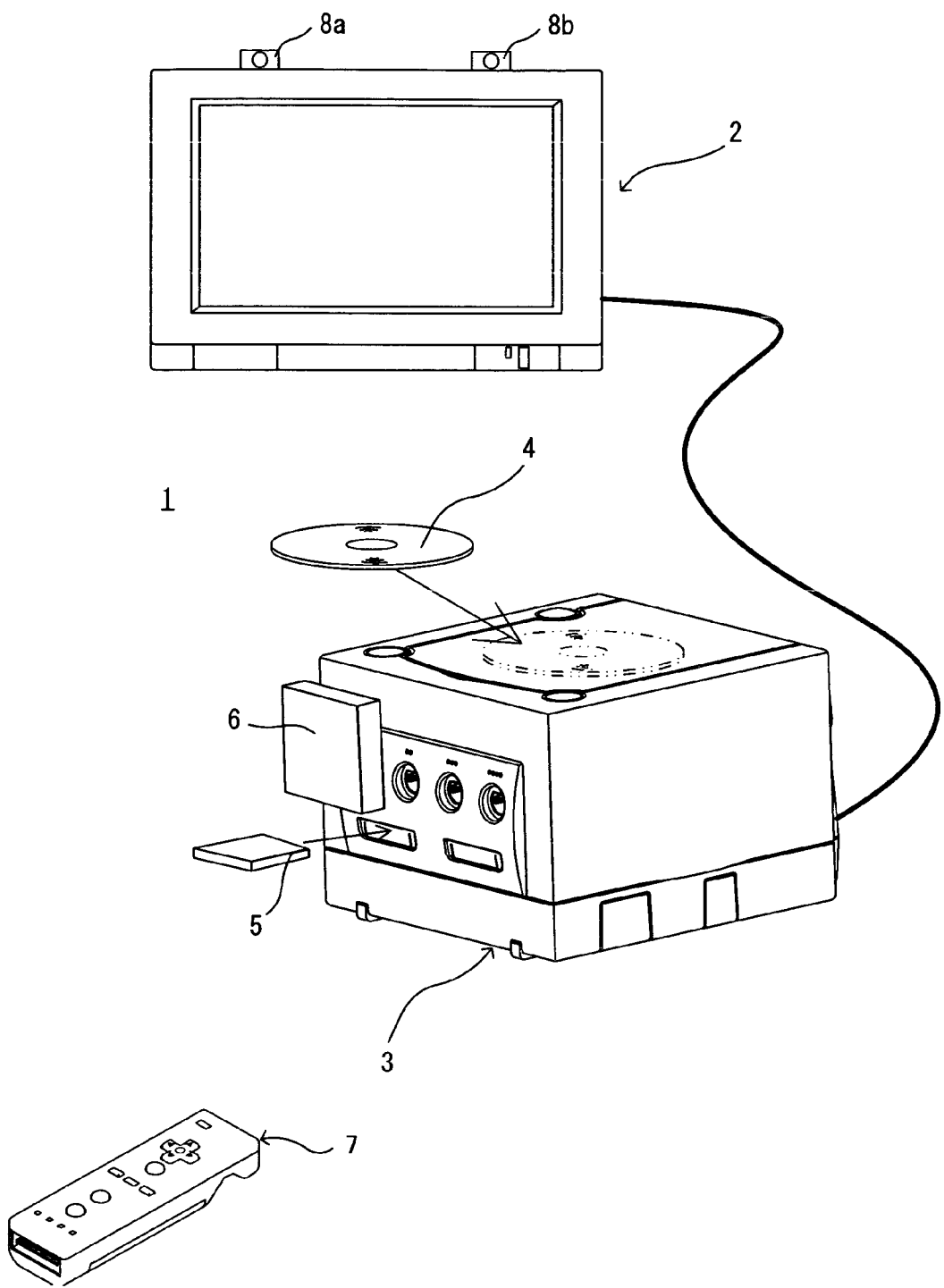
FIG. 1 is an external view of a game system 1 including a game apparatus 3 as an exemplary information processing apparatus according to one embodiment of the present invention.

With reference to FIG. 1, a game system 1 including a game apparatus 3 as an exemplary information processing apparatus according to one embodiment of the present invention will be described. FIG. 1 is an external view illustrating the game system 1. Hereinafter, an information processing apparatus according to the present invention will be described using the game apparatus 3 of an installation type as an example.

As shown in FIG. 1, the game system 1 includes the installation type game apparatus (hereinafter, referred to simply as a "game apparatus") 3, which is connected to a display (hereinafter, referred to as a "monitor") 2 such as a home-use TV receiver including a speaker (represented with reference numeral 22 in FIG. 2) via a connection cord, and a controller 7 for giving operation data to the game apparatus 3. Two markers 8a and 8b are provided in the vicinity of the monitor 2 (above the screen of the monitor 2 in FIG. 1). The markers 8a and 8b are specifically infrared LEDs, and each outputs infrared light forward from the monitor 2. The game apparatus 3 is connected to a receiving unit 6 via a connection terminal. The receiving unit 6 receives operation data which is wirelessly transmitted from the controller 7. The controller 7 and the game apparatus 3 are connected to each other by wireless communication. In other embodiments, the controller 7 and the game apparatus 3 may be connected to each other in a wired manner. On the game apparatus 3, an optical disc 4 as an example of an exchangeable information storage medium is detachably mounted. The game apparatus 3 has, on a top main surface thereof, a power ON/OFF switch, a game processing reset switch, and an OPEN switch for opening a top lid of the game apparatus 3. When a player presses the OPEN switch, the lid is opened, so that the optical disc 4 is mounted or dismounted.

On the game apparatus 3, an external memory card 5 is detachably mounted when necessary. The external memory card 5 has a backup memory or the like mounted thereon for fixedly storing saved data or the like. The game apparatus 3 executes a game program or the like stored on the optical disc 4 and displays the result on the monitor 2 as a game image. The game apparatus 3 can also reproduce a state of a game played in the past using saved data stored on the memory card 5 and display the game image on the monitor 2. The player playing with the game apparatus 3 can enjoy the game by operating the controller 7 while watching the game image displayed on the display screen of the monitor 2.

The controller 7 wirelessly transmits operation data from a communication section 36 included therein (described later) to the game apparatus 3 connected to the receiving unit 6, using the technology of, for example, Bluetooth (registered trademark). The controller 7 includes an operation section having a plurality of operation buttons or keys. As described later in detail, the controller 7 also includes an acceleration sensor 37 (described later) for detecting an acceleration in at least two axial directions perpendicular to each other. Data representing the acceleration detected by the acceleration sensor 37 is transmitted to the game apparatus 3 as a part of the operation data. The controller 7 includes an imaging information calculation section 35 (described later) for taking an image seen from the controller 7. The imaging information calculation section 35 takes an image of each of the markers 8a and 8b located in the vicinity of the monitor 2. The game apparatus 3 executes processing in accordance with the position and the posture of the controller 7 by calculation processing based on the images.

Figure 2:
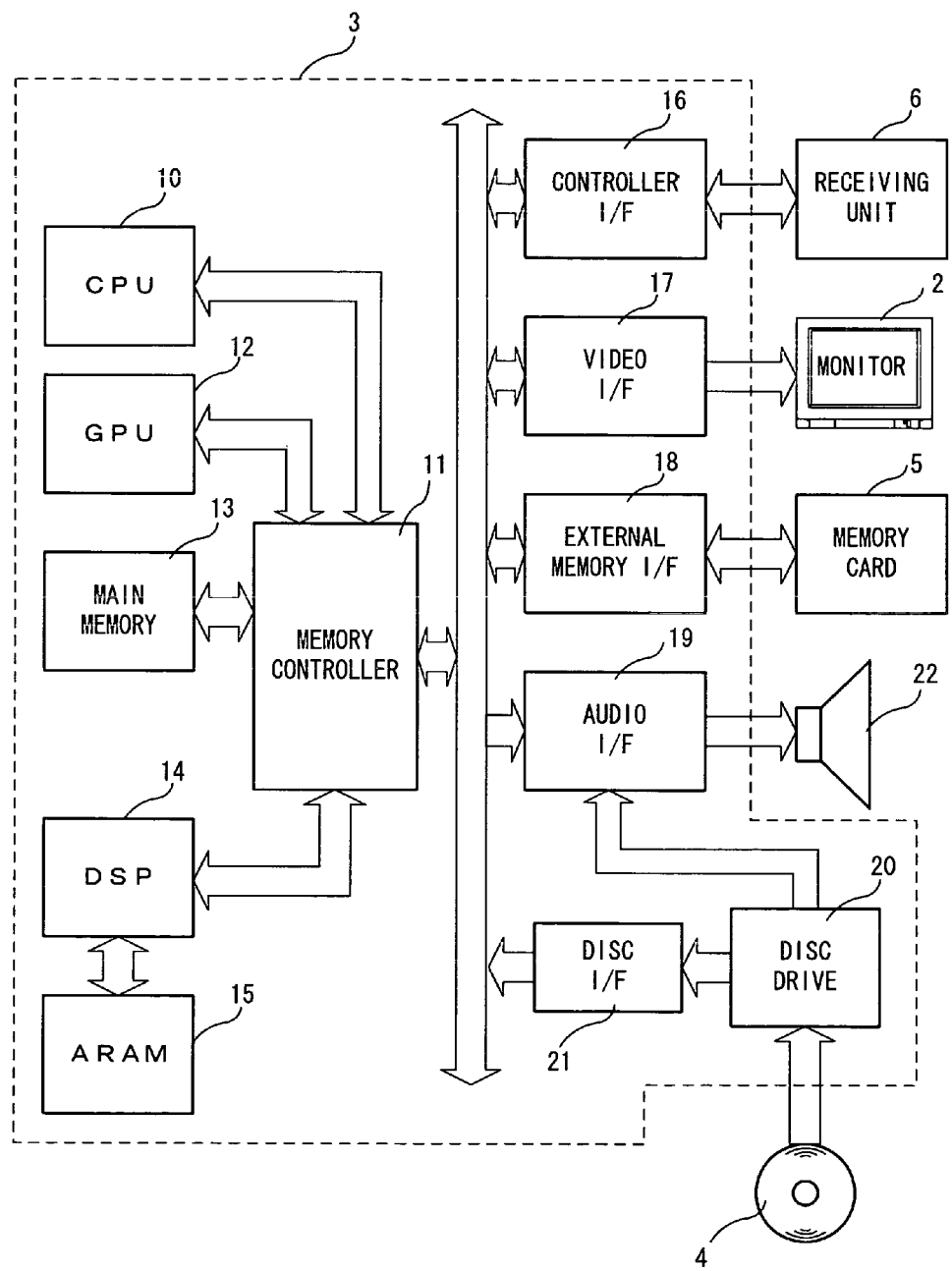
FIG. 2 is a functional block diagram of the game apparatus 3.

With reference to FIG. 2, a structure of the game apparatus 3 will be described. FIG. 2 is a functional block diagram of the game apparatus 3.

As shown in FIG. 2, the game apparatus 3 includes, for example, a RISC CPU (central processing unit) 10 for executing various types of programs. The CPU 10 executes a start program stored in a boot ROM (not shown) to, for example, initialize memories including a main memory 13, and then executes a game program stored on the optical disc 4 to perform game processing or the like in accordance with the game program. The CPU 10 is connected to a GPU (Graphics Processing Unit) 12, the main memory 13, a DSP (Digital Signal Processor) 14, and an ARAM (Audio RAM) 15 via a memory controller 11. The memory controller 11 is connected to a controller I/F (interface) 16, a video I/F 17, an external memory I/F 18, an audio I/F 19, and a disc I/F 21 via a predetermined bus. The controller I/F 16, the video I/F 17, the external memory I/F 18, the audio I/F 19 and the disc I/F 21 are respectively connected to the receiving unit 6, the monitor 2, the external memory card 5, the speaker 22 and a disc drive 20.

The GPU 12 performs image processing based on an instruction from the CPU 10. The GPU 12 includes, for example, a semiconductor chip for performing calculation processing necessary for displaying 3D graphics. The GPU 12 performs the image processing using a memory dedicated for image processing (not shown) and a part of the storage area of the main memory 13. The GPU 12 generates game image data and a movie to be displayed on the display screen of the monitor 2 using such memories, and outputs the generated data or movie to the monitor 2 via the memory controller 11 and the video I/F 17 as necessary.

The main memory 13 is a storage area used by the CPU 10, and stores a game program or the like necessary for processing performed by the CPU 10 as necessary. For example, the main memory 13 stores a game program read from the optical disc 4 by the CPU 10, various types of data or the like. The game program, the various types of data or the like stored on the main memory 13 are executed by the CPU 10.

The DSP 14 processes sound data or the like generated by the CPU 10 during the execution of the game program. The DSP 14 is connected to the ARAM 15 for storing the sound data or the like. The ARAM 15 is used when the DSP 14 performs predetermined processing (for example, storage of the game program or sound data already read). The DSP 14 reads the sound data stored in the ARAM 15 and outputs the sound data to the speaker 22 included in the monitor 2 via the memory controller 11 and the audio I/F 19.

The memory controller 11 comprehensively controls data transfer, and is connected to the various I/Fs described above. The controller I/F 16 includes, for example, four controller I/Fs, and communicably connects the game apparatus 3 to an external device which is engageable via connectors of the controller I/Fs. For example, the receiving unit 6 is engaged with such a connector and is connected to the game apparatus 3 via the controller I/F 16. As described above, the receiving unit 6 receives the operation data from the controller 7 and outputs the operation data to the CPU 10 via the controller I/F 16. In other embodiments, the game apparatus 3 may include a receiving module for receiving the operation data transmitted from the controller 7, instead of the receiving unit 6. In this case, the operation data received by the receiving module is output to the CPU 10 via a predetermined bus. The video I/F 17 is connected to the monitor 2. The external memory I/F 18 is connected to the external memory card 5 and is accessible to a backup memory or the like provided in the external card 5. The audio I/F 19 is connected to the speaker 22 built in the monitor 2, and is connected such that the sound data read by the DSP 14 from the ARAM 15 or sound data directly output from the disc drive 20 is output from the speaker 22. The disc I/F 21 is connected to the disc drive 20. The disc drive 20 reads data stored at a predetermined reading position of the optical disc 4 and outputs the data to a bus of the game apparatus 3 or the audio I/F 19.

Figure 3A:
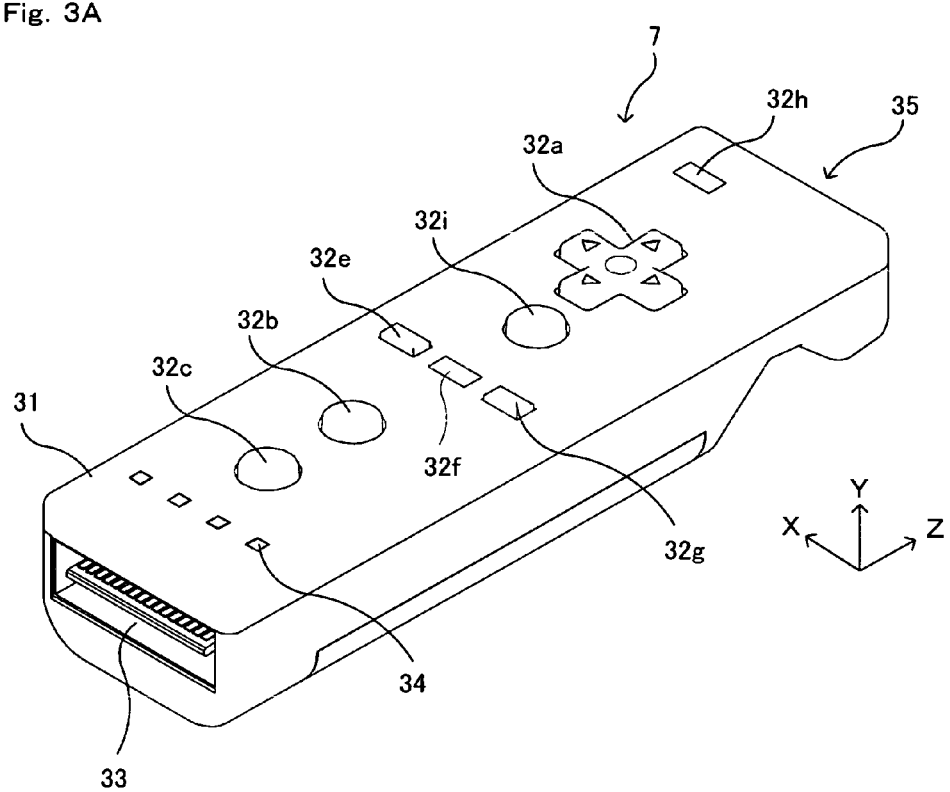
FIG. 3A is an isometric view of a controller 7.
Figure 3B:
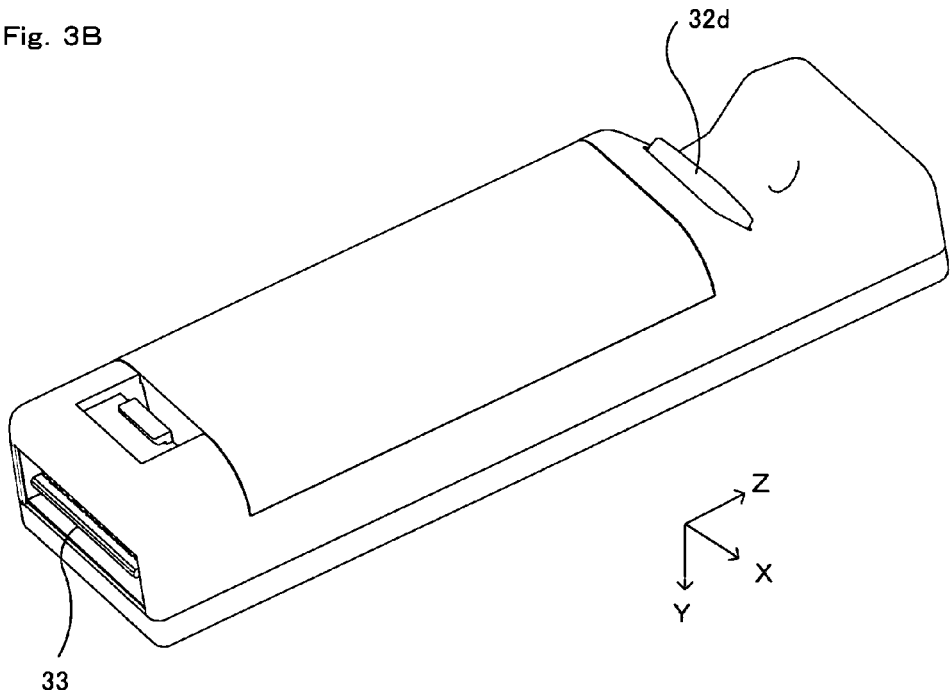
FIG. 3B is an isometric view of the controller 7.
Figure 4:
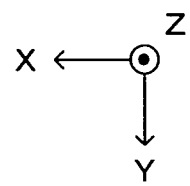
FIG. 4 is a front view of the controller 7.
Figure 4:
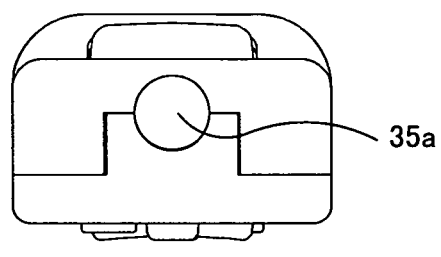

With reference to FIG. 3A through FIG. 8, the controller 7 will be described. FIG. 3A and FIG. 3B are external isometric views of the controller 7. FIG. 3A is an isometric view of the controller 7 seen from the top rear side thereof. FIG. 3B is an isometric view of the controller 7 seen from the bottom rear side thereof. FIG. 4 is a front view of the controller 7.

As shown in FIG. 3A through FIG. 4, the controller 7 includes a housing 31 formed by plastic molding or the like. The housing 31 has a generally parallelepiped shape extending in a longitudinal or front-rear direction (Z-axis direction shown in FIG. 3A and FIG. 3B). The overall size of the housing 31 is small enough to be held by one hand of an adult or even a child. The player can perform a game operation by, for example, pressing buttons or keys provided on the controller 7 or changing the position or direction of the controller 7 itself. For example, the player can perform an operation on an operation target by rotating the controller 7 around an axis in the longitudinal direction thereof or changing the position indicated by the controller 7 on the display screen. The "position indicated by the controller 7 on the display screen" ideally refers to a position at which a phantom straight line extending from a front end of the controller 7 in the longitudinal direction crosses the display screen of the monitor 2. However, the "position indicated by the controller 7 on the display screen" does not need to be exactly such a position, but may be a position in the vicinity thereof which can be calculated by the game apparatus 3. Hereinafter, such a position will be sometimes referred to as an "indicated position" or an "indicated position by the controller 7". The longitudinal direction of the controller 7 (housing 31) will be sometimes referred to as an "indicated direction".

The housing 31 has a plurality of operation buttons or keys. Provided on a top surface of the housing 31 are a cross key 32a, an X button 32b, a Y button 32c, an A button 32i, a select switch 32e, a menu switch 32f, and a start switch 32g. On a bottom surface of the housing 31, a recessed portion is formed. On a rears lope surface of the recessed portion, a B button 32d is provided. These buttons and switches are assigned various functions in accordance with the game program executed by the game apparatus 3, but this will not be described in detail because the functions are not directly relevant to the present invention. On the top surface of the housing 31, a powers witch 32h is provided for remotely turning on or off the game apparatus 3.

Figure 5A:
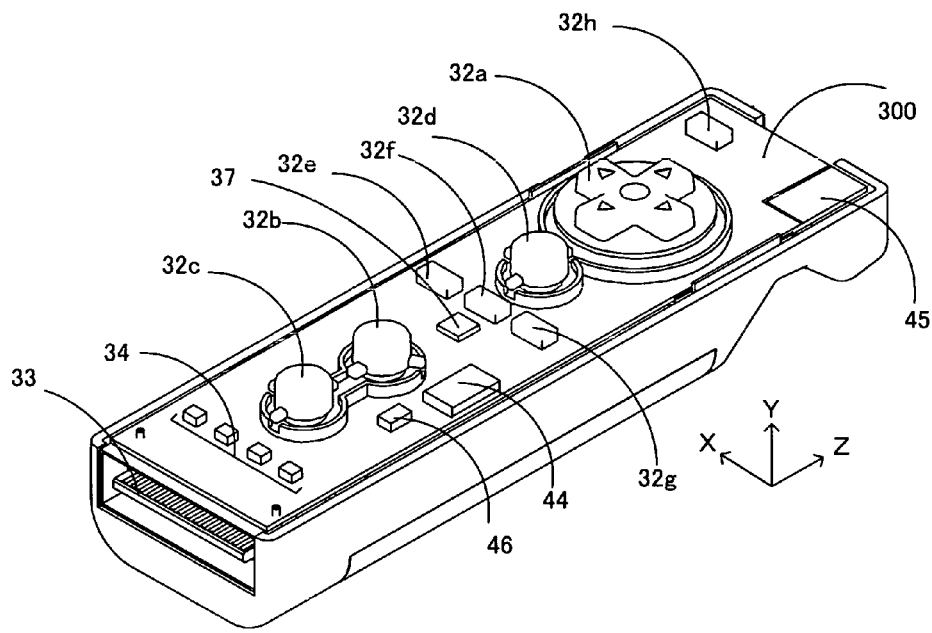
FIG. 5A shows an inner structure of the controller 7.
Figure 5B:
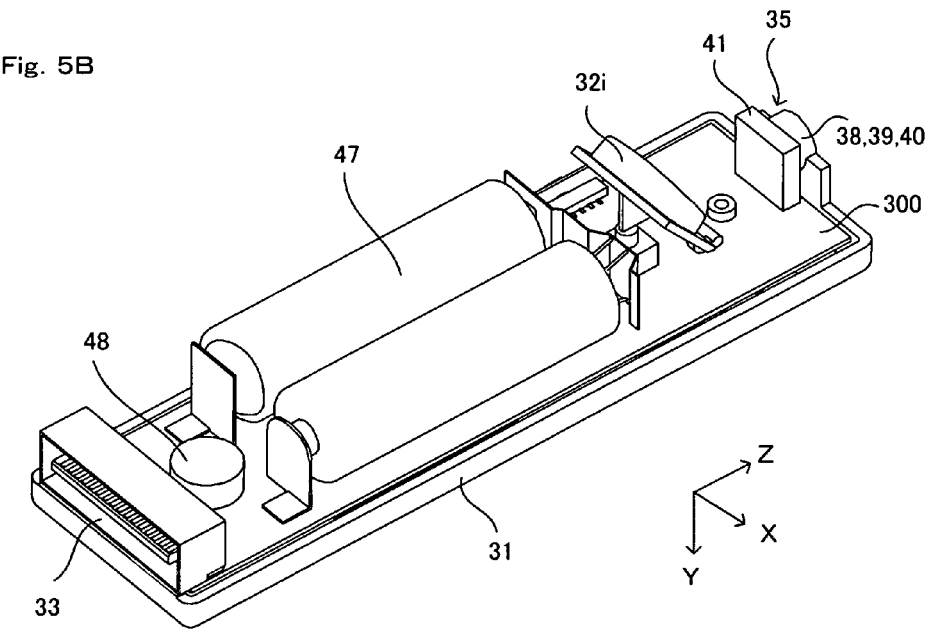
FIG. 5B shows an inner structure of the controller 7.

The controller 7 has the imaging information calculation section 35 (FIG. 5B). As shown in FIG. 4, a light incident opening 35a of the imaging information calculation section 35 is provided on a front surface of the housing 31. On a rear surface of the housing 31, a connector 33 is provided. The connector 33 is, for example, a 32-pin edge connector, and is used for connecting the controller 7 to another device. In a rear part of the top surface of the housing 31, a plurality of LEDs 34 are provided. The controller 7 is assigned a controller type (number) so as to be distinguishable from the other controllers 7. The LEDs 34 are used for informing the player of the controller type which is currently set to controller 7 that he/she is using. Specifically, when the controller 7 transmits the operation data to the game apparatus 3, one of the plurality of LEDs 34 corresponding to the controller type is lit up.

With reference to FIG. 5A and FIG. 5B, an internal structure of the controller 7 will be described. FIG. 5A and FIG. 5B illustrate an internal structure of the controller 7. FIG. 5A is an isometric view illustrating a state where an upper casing (a part of the housing 31) of the controller 7 is removed. FIG. 5B is an isometric view illustrating a state where a lower casing (a part of the housing 31) of the controller 7 is removed. FIG. 5B shows a reverse side of a substrate 300 shown in FIG. 5A.

As shown in FIG. 5A, the substrate 300 is fixed inside the housing 31. On a top main surface of the substrate 300, the operation buttons 32a through 32h, an acceleration sensor 37, the LEDs 34, a quartz oscillator 46, a wireless module 44, an antenna 45 and the like are provided. These elements are connected to a microcomputer 42 (see FIG. 6) via lines (not shown) formed on the substrate 300 and the like. The wireless module 44 and the antenna 45 allow the controller 7 to act as a wireless controller. The quartz oscillator 46 generates a reference clock of the microcomputer 42 described later.

As shown in FIG. 5B, at a front edge of a bottom main surface of the substrate 300, the imaging information calculation section 35 is provided. The imaging information calculation section 35 includes an infrared filter 38, a lens 39, an imaging element 40 and an image processing circuit 41 located in this order from the front surface of the controller 7. These elements are attached to the bottom main surface of the substrate 300. At a rear edge of the bottom main surface of the substrate 300, the connector 33 is attached. The A button 32i is attached on the bottom main surface of the substrate 300 rearward to the imaging information calculation section 35, and cells 47 are accommodated rearward to the A button 32i. On the bottom main surface of the substrate 300 between the cells 47 and the connector 33, a vibrator 48 is attached. The vibrator 48 may be, for example, a vibration motor or a solenoid. The controller 7 is vibrated by an actuation of the vibrator 48, and the vibration is conveyed to the player holding the controller 7. Thus, a so-called vibration-responsive game is realized.

The shape of the controller 7, and the shape, number, position or the like of the operation buttons and switches shown in FIG. 3A through FIG. 5B are merely exemplary, and may be altered without departing from the scope of the present invention. The position of the imaging information calculation section 35 (the light incident opening 35a of the imaging information calculation section 35) in the controller 7 does not need to be on the front surface of the housing 31, and may be on another surface as long as light can enter from the outside of the housing 31. In this case, the "indicated direction by the controller 7" is a direction vertical to the light incident opening, i.e., is the imaging direction of the imaging element 40.

Figure 6:
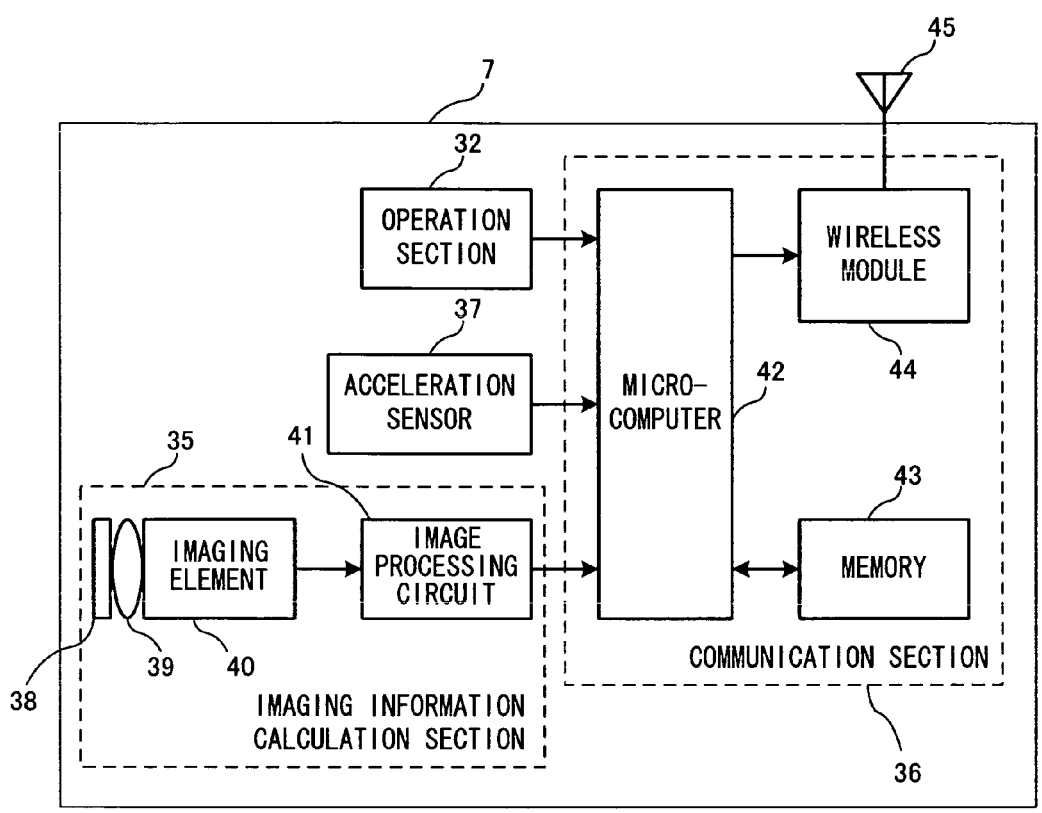
FIG. 6 is a block diagram illustrating a structure of the controller 7.

FIG. 6 is a block diagram showing a structure of the controller 7. The controller 7 includes the operation section 32 (operation buttons or keys), the imaging information calculation section 35, the communication section 36, and the acceleration sensor 37.

The imaging information calculation section 35 is a system for analyzing image data taken by imaging means and detecting the position of the center of gravity, the size and the like of an area having a high brightness in the image data. The imaging information calculation section 35 has, for example, a maximum sampling period of about 200 frames/sec., and therefore can trace and analyze even a relatively fast motion of the controller 7.

The imaging information calculation section 35 includes the infrared filter 38, the lens 39, the imaging element 40 and the image processing circuit 41. The infrared filter 38 allows only infrared light to pass therethrough, among light incident on the front surface of the controller 7. The markers 8a and 8b located in the vicinity of the display screen of the monitor 2 are infrared LEDs for outputting infrared light forward from the monitor 2. Therefore, the provision of the infrared filter 38 allows the image of each of the markers 8a and 8b to be taken more accurately. The lens 39 collects the infrared light which has passed through the infrared filter 38 and outputs the infrared light to the imaging element 40. The imaging element 40 is a solid-state imaging device such as, for example, a CMOS sensor or a CCD. The imaging element 40 takes an image of the infrared light collected by the lens 39. Accordingly, the imaging element 40 takes an image of only the infrared light which has passed through the infrared filter 38 and generates image data. Hereinafter, an image taken by the imaging element 40 will be referred to as a "taken image". The image data generated by the imaging element 40 is processed by the image processing circuit 41. The image processing circuit 41 calculates the positions of the imaging targets (the markers 8a and 8b) in the taken image. Hereinafter, a method for calculating the positions of the imaging targets will be described with reference to FIG. 7.

Figure 7:
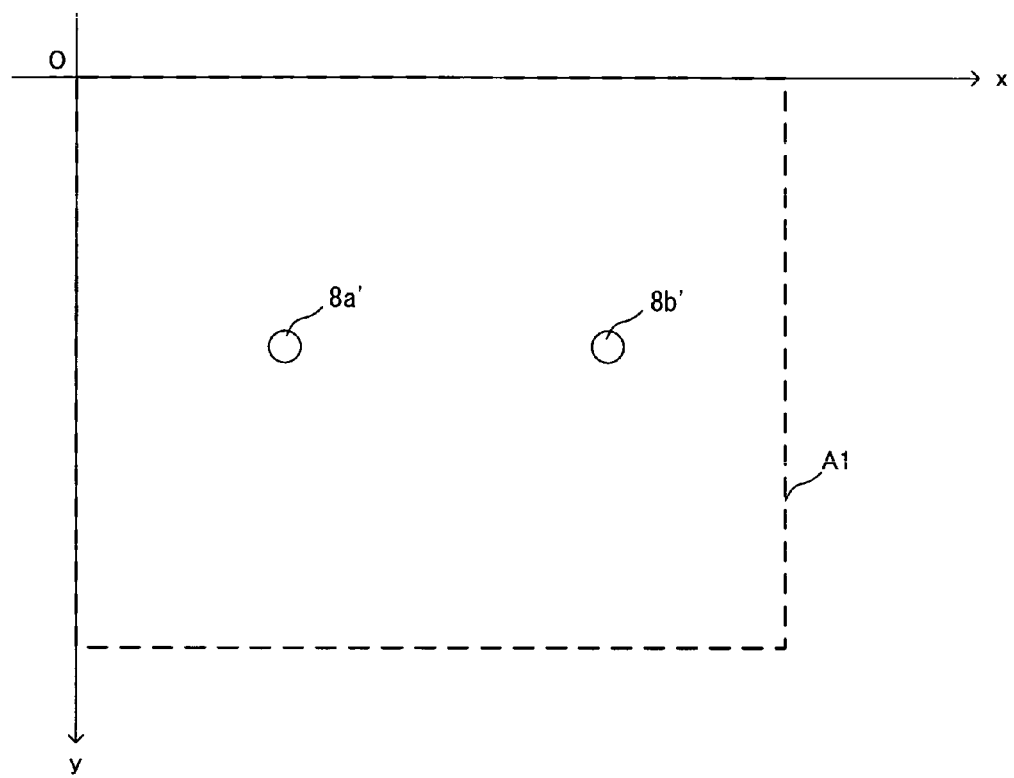
FIG. 7 shows an example of a taken image.

FIG. 7 shows an example of a taken image. In a taken image A1 shown in FIG. 7, an image 8a' of the marker 8a and an image 8b' of the marker 8b are arranged side by side. When a taken image is input, the image processing circuit 41 calculates a coordinate set representing the position of each of areas in the taken image which match a predetermined condition. Here, the predetermined condition is a condition for specifying an image of an imaging target (target image). A specific predetermined condition is that the area has a brightness of a predetermined value or greater (a high luminance area) and has a size within a predetermined size range. The predetermined condition only needs to be a condition for specifying an imaging target, and in other embodiments, may include a condition regarding the color of the image.

For calculating the position of the target image, the image processing circuit 41 specifies high brightness areas described above from the areas in the taken image as candidates for the target image. The reason is that a target image appears as a high brightness area in the image data of the taken image. Next, based on the size of each specified high brightness area, the image processing circuit 41 executes determination processing of determining whether or not each of the high brightness areas is a target image. The taken image may include images other than the target images, i.e., images 8a' and 8b' of the markers 8a and 8b, due to sunlight coming through a window or light of a fluorescent lamp. In this case, the images other than the images 8a' and 8b' of the markers 8a and 8b also appear as high brightness areas. The above-mentioned determination processing is executed in order to distinguish the images 8a' and 8b' as the target images from the other images, so that the target images are accurately specified. Specifically, it is determined whether or not each specified high brightness area has a size within a predetermined size range. When the high brightness area has a size within the predetermined size range, such an area is determined to represent a target image; whereas when the high brightness area has a size outside the predetermined size range, such an area is determined to represent an image other than a target image.

The image processing circuit 41 calculates the position of a high brightness area which is determined to represent a target image as a result of the determination. Specifically, the image processing circuit 41 calculates the position of the center of gravity of the high brightness area. The position of the center of gravity can be calculated in a scale more detailed than the resolution of the imaging element 40. Here, the resolution of a taken image imaged by the imaging element 40 is 126×96, and the position of the center of gravity is calculated at a scale of 1024×768. Namely, the coordinate set of the position of the center of gravity is represented by integers of (0, 0) to (1024, 768). As shown in FIG. 7, positions in the taken image are represented by a coordinate system (x-y coordinate system), in which the upper left corner of the taken image is the origin, the downward direction from the origin is a positive y-axis direction, and the rightward direction from the origin is a positive x-axis direction.

As described above, the image processing circuit 41 calculates the coordinate set representing the position of each of areas in the taken image which match the predetermined condition. Hereinafter, a coordinate set calculated by the image processing circuit 41 is referred to as a "marker coordinate set". A marker coordinate set represents the position of an imaging target, in a coordinate system used for representing positions in a plane corresponding to the taken image. The image processing circuit 41 outputs a marker coordinate set to the microcomputer 42 of the communication section 36. Data on the marker coordinate set is transmitted to the game apparatus 3 as operation data by the microcomputer 42. Since the marker coordinate set varies in accordance with the direction (posture) or position of the controller 7 itself, the game apparatus 3 can calculate the direction or position of the controller 7 using the marker coordinate set. In this embodiment, the processing of calculating a marker coordinate set from the taken image is executed by the image processing circuit 41 and/or the microcomputer 42 of the controller 7. Alternatively, the taken image may be transmitted to the game apparatus 3 and the subsequent processing may be executed by the CPU 10 or the like of the game apparatus 3.

In other embodiments, a lengthy light source may be used instead of the two markers 8a and 8b. By calculating the coordinate sets representing the positions of both ends of the light source, coordinate sets equivalent to the marker coordinate sets can be obtained. Namely, by calculating the two positions of one marker, the coordinate sets equivalent to the marker coordinate sets can be obtained.

Returning to FIG. 6, the acceleration sensor 37 detects an acceleration (including acceleration of gravity) of the controller 7. Namely, the acceleration sensor 37 detects a value of the acceleration in a linear direction along a sensing axis among the accelerations acting on a detection section of the acceleration sensor 37. In the case of a two axial or three axial acceleration sensor, for example, an acceleration of a component along each axis (linear acceleration) is detected as an acceleration acting on the detection section of the acceleration sensor. In this embodiment, the acceleration sensor 37 detects a linear acceleration in each of an up-down direction with respect to the controller 7 (Y-axis direction shown in FIG. 3A and FIG. 3B), a left-right direction with respect to the controller 7 (X-axis direction shown in FIG. 3A and FIG. 3B), and a front-rear direction with respect to the controller 7 (Z-axis direction shown in FIG. 3A and FIG. 3B). Since the acceleration sensor 37 detects an acceleration in the linear direction along each axis, the output from the acceleration sensor 37 represents a value of the linear acceleration along each of the three axes. Namely, the detected acceleration is represented as a three-dimensional vector in an X-Y-Z coordinate system which is set with respect to the controller 7. Data representing the acceleration detected by the acceleration sensor 37 (acceleration data) is output to the microcomputer 42. In this embodiment, the acceleration data is not used for game processing, and therefore the controller 7 may not include the acceleration sensor 37.

The operation section 32 outputs data representing an input state on the operations keys 32a through 32i including the cross key 32a (whether or not each of the operations keys 32a through 32i is pressed) to the microcomputer 42 of the communication section 36.

The communication section 36 includes the microcomputer 42, a memory 43, the wireless module 44 and the antenna 45. The microcomputer 42 controls the wireless module 44 for wirelessly transmitting the data obtained by the microcomputer 42 while using the memory 43 as a storage area during processing.

Data which is output from the operation section 32 and the imaging information calculation section 35 (and the acceleration sensor 37) to the microcomputer 42 is temporarily stored in the memory 43. The wireless transmission from the communication section 36 to the receiving unit 6 is performed at a predetermined time interval. Since game processing is generally performed at a cycle of 1/60 sec. (at a cycle of one frame), the wireless transmission is preferably performed at a cycle of a time period equal to or shorter than 1/60 sec. At the transmission timing to the receiving unit 6, the microcomputer 42 outputs the data stored in the memory 43 to the wireless module 44 as operation data. The wireless module 44 uses, for example, the Bluetooth (registered trademark) technology to modulate a carrier wave of a predetermined frequency with the operation data and radiate the resultant very weak electric signal from the antenna 45. Namely, the operation data is modulated into a very weak electric signal by the wireless module 44 and transmitted from the controller 7. The very weak electric signal is received by the receiving unit 6 on the side of the game apparatus 3. The received very weak electric signal is demodulated or decoded, so that the game apparatus 3 can obtain the operation data. The CPU 10 of the game apparatus 3 executes the game processing based on the obtained operation data and the game program.

By using the controller 7, the player can perform a game operation of changing the posture of the controller 7, moving the position of the controller 7 or rotating the controller 7, in addition to a conventional general operation of pressing the operation buttons or switches.

Figure 8:
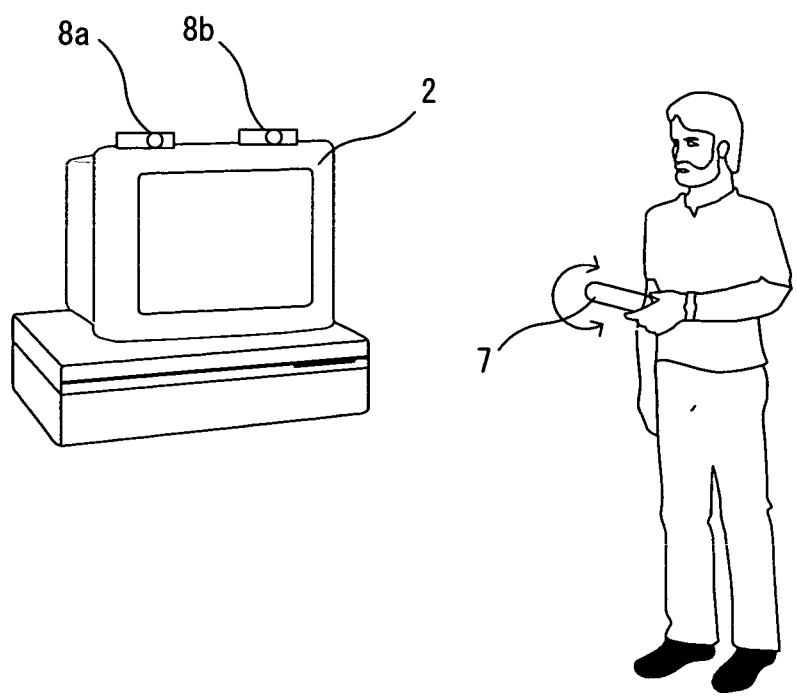
FIG. 8 shows a general view of a game operation performed using the controller 7.

FIG. 8 is a general view of a game operation performed using the controller 7. As shown in FIG. 8, when playing the game using the controller 7 with the game system 1, the player holds the controller 7 with one hand. The markers 8a and 8b are located above the screen in parallel to the transverse or width direction of the monitor 2. In other embodiments, the markers 8a and 8b may be located at arbitrary positions in an arbitrary direction. For example, the markers 8a and 8b may be located below the screen, or the two markers 8a and 8b may be arranged in a vertical or length direction of the screen. The player holds the controller 7 such that the front surface of the controller 7 (having the light incident opening 35a by which the imaging information calculation section 35 takes the image of each of the markers 8a and 8b) faces the markers 8a and 8b. In this state, the player performs a game operation by changing the inclination of the controller 7 (as represented by the arrows in FIG. 8), the position on the screen indicated by the controller 7 (indicated position), or the distance between the controller 7 and the markers 8a or 8b.

Hereinafter, a specific example of the game played using the game system 1 will be described. In this embodiment, a puzzle game played using the game system 1 will be described as an example.

Figure 9:
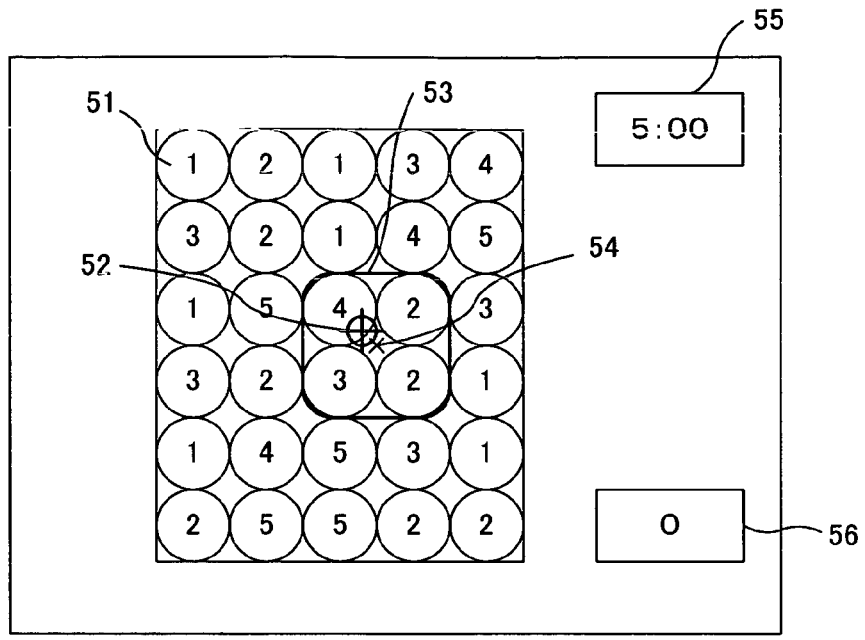
FIG. 9 shows a game image in a movable state.
Figure 10:
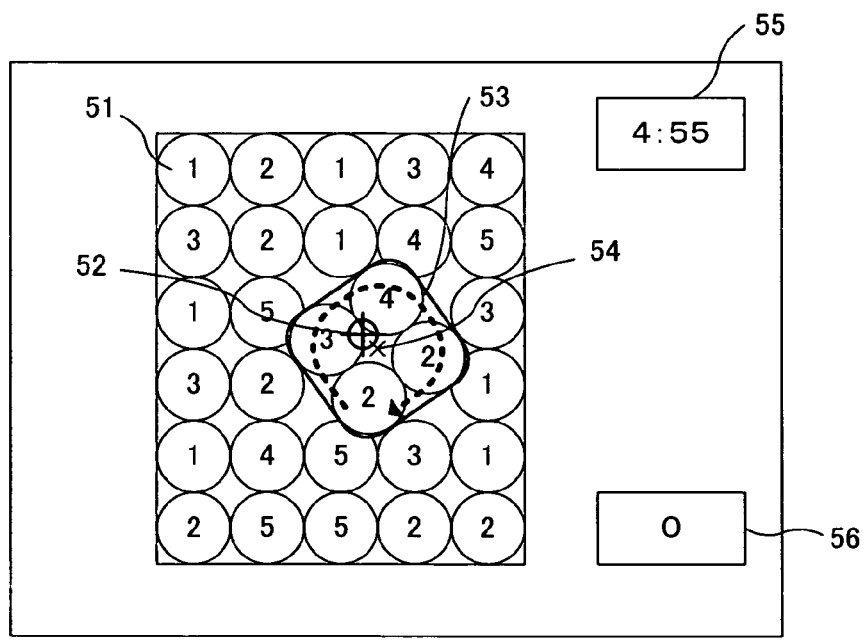
FIG. 10 shows a game image in a replaceable state.
Figure 11:
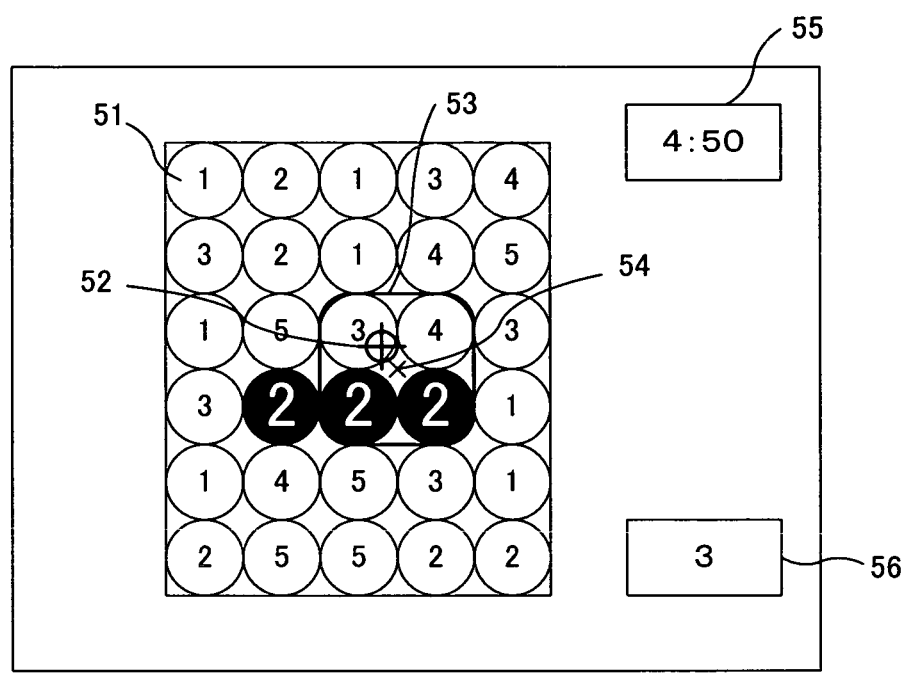
FIG. 11 shows a game image immediately after the game state is transferred from the replaceable state to the movable state.

FIG. 9 through FIG. 11 show exemplary game images of a puzzle game in this embodiment. In this embodiment, a plurality of panels 51, a cursor 52, a frame 53, a mark 54, a remaining time image 55, and a point image 56 are displayed on the screen of the monitor 2. The panels 51 are arranged in six rows by five columns. A total of 30 panels 51 are displayed. Each panel is assigned a number. Panels having an identical number are of the same type. In this puzzle game, the player can replace the positions of panels by a replacement operation described later. When three panels of the same type are arranged in the same row or in the same column by the replacement operation, such panels are deleted. The purpose of this game is to delete as many panels as possible within a preset time limit. The remaining time image 55 shows the remaining time until the time limit. The point image 56 shows the current point, i.e., the number of panels deleted so far.

In the game in this embodiment, the player can perform a moving operation of moving the cursor 52 and the replacement operation of replacing the panels. Namely, the game apparatus 3 accepts the moving operation and the replacement operation by the player. Hereinafter, a game state in which the moving operation is acceptable will be referred to as a "movable state", and a game state in which the replacement operation is acceptable will be referred to as a "replaceable state".

FIG. 9 shows a game image in the movable state. In the movable state, the game apparatus 3 follows the moving operation by the player to move the cursor 52 on the screen. Specifically, the game apparatus 3 calculates the indicated position by the controller 7 using the operation data obtained from the controller 7, and displays the cursor 52 at the indicated position. As the moving operation, the player performs an operation of changing the position and/or posture of the controller 7 so as to change the indicated position by the controller 7.

In the movable state, the player moves the frame 53 to desired position by moving the cursor 52. The frame 53 indicates the panels as replacement targets, which are to be replaced by the replacement operation. The frame 53 is located so as to surround any four panels arranged in two rows by two columns. In this embodiment, the four panels surrounded by the frame 53 are the panels as the replacement targets (referred to as "target panels"). The frame 53 moves along with the cursor 52. Specifically, the frame 53 moves such that the cursor 52 is always in the frame 53. For example, when the cursor 52 moves leftward from the position shown in FIG. 9 and is about to go beyond the left side of the frame 53, the game apparatus 3 moves the frame 53 leftward by one column. In the movable state, the player moves the frame 53 such that the frame 53 surrounds the four panels that he/she intends to replace. The mark 54 represents the central position of the area surrounded by the frame 53.

When a predetermined replacement instruction button on the controller 7 (for example, the B button 32d) is pressed in the movable state, the game apparatus 3 transfers the game state from the movable state to there placeable state. In this embodiment, while the replacement instruction button is pressed, the game state is set to the replaceable state. When the replacement instruction button is released (not pressed anymore), the game state is returned from the replaceable state to the movable state. The player can perform the replacement operation while pressing the replacement instruction button. Once the frame 53 is moved to a desired position in the movable state, the player can press the replacement instruction button to start the replacement operation.

In the replaceable state, the game apparatus 3 calculates an angle of inclination as a part of the rotation of the controller 7 around an axis in the longitudinal direction of the controller 7 (Z-axis direction shown in FIG. 3A and FIG. 3B), based on the operation data obtained from the controller 7. In accordance with the inclining angle, the game apparatus 3 rotates the frame 53. The replacement operation is an operation of rotating the controller 7 around an axis in the longitudinal direction. In the following description, the "rotation of the controller 7" refers to the "rotation of the controller 7 around an axis in the longitudinal direction", and the "inclination of the controller 7" refers to the "inclination as a part of the rotation of the controller 7 around an axis in the longitudinal direction".

FIG. 10 shows a game image in the replaceable state. FIG. 10 shows a state obtained by rotating the controller 7 clockwise at about 60° from the state of the controller 7 when the replacement instruction button was pressed. In this specification, the terms "clockwise" and "counterclockwise" refer to the directions seen from the rear end of the controller 7 (seen from the negative end of the Z axis in FIG. 3A and FIG. 3B). As shown in FIG. 10, the target panels have been rotated around the mark 54 by a rotation amount in accordance with the inclining angle of the controller 7, from the state when the replacement instruction button was pressed (the state shown in FIG. 9). In FIG. 10, the target panels have been rotated clockwise at about 60° from the state shown in FIG. 9. In the replaceable state, the game apparatus 3 rotates the target panels in accordance with the inclination of the controller 7. In this specification, the expression that "the panels are rotated" means that a group of panels surrounded by the frame are rotated around the center of the frame, and does not mean that the panels are rotated around the center of each panel.

In this embodiment, the game apparatus 3 rotates the target panels up to 270° clockwise or counterclockwise with respect to the reference direction (0°) when the game state is set to the replaceable state. The player replaces the four target panels by rotating the target panels at 90°, 180° or 270° clockwise or counterclockwise. When the four target panels reach desired positions, the player releases the replacement instruction button and transfers the game state to the movable state.

In this embodiment, in the movable state, the 30 panels are arranged in six rows by five columns. If the target panels are not located in accordance with this arrangement at the end of the replaceable state, the game apparatus 3 corrects the positions of the target panels when necessary.

FIG. 11 shows a game image immediately after the game state is transferred from the replaceable state to the movable state. FIG. 11 shows a state obtained by rotating the target panels at 90° clockwise by the replacement operation shown in FIG. 10, from the state shown in FIG. 9. At each panel position in the frame 53, the pre-replacement panel has been replaced with another panel. For example, at the top left position in the frame 53, the number "4" panel has been replaced with the number "3" panel. In the entire area within the frame 53, the positions of the four panels are replaced. In this embodiment, the objects (panels) displayed on the screen can be replaced by changing the inclination of the controller 7 in the replaceable state.

In this embodiment, the four target panels are replaced in a circulating manner. Here, the expression "replacing in a circulating manner" refers to replacing the objects (panels) as the replacement targets such that the positions thereof are circulated in a predetermined order. By moving the panels in accordance with a predetermined rule in this manner, the puzzle game can be more amusing to play, with abider variety of strategies available.

In FIG. 11, three panels of the same type (the number "2" panels) are arranged in the fourth row from the top. These three panels are deleted. FIG. 11 shows the three panels to be deleted in black with white letters. Because the three panels are deleted, the player obtains three points (see the point image 56 in FIG. 11). In this embodiment, when the panels are deleted, the game apparatus 3 adds new panels to the positions from which the panels have been deleted. After this, the player attempts to delete more panels by performing the moving operation and the replacement operation until the time is up.

As described above, in this embodiment, the player can replace the target panels by the replacement operation of rotating the controller 7 around an axis in the longitudinal direction. In other words, the player can enjoy a novel operation of replacing the objects (panels) displayed on the screen by rotating the controller 7 itself.

Also in this embodiment, the player can perform an operation of selecting panels to be replacement targets by moving the indicated position by the controller 7. The player can perform two different operations (moving operation and replacement operation) by changing the manner of handling the controller 7. The present invention allows the player to perform two different operations by simple handling of the controller 7, and provides a highly maneuverable game to the player.

Figure 12:
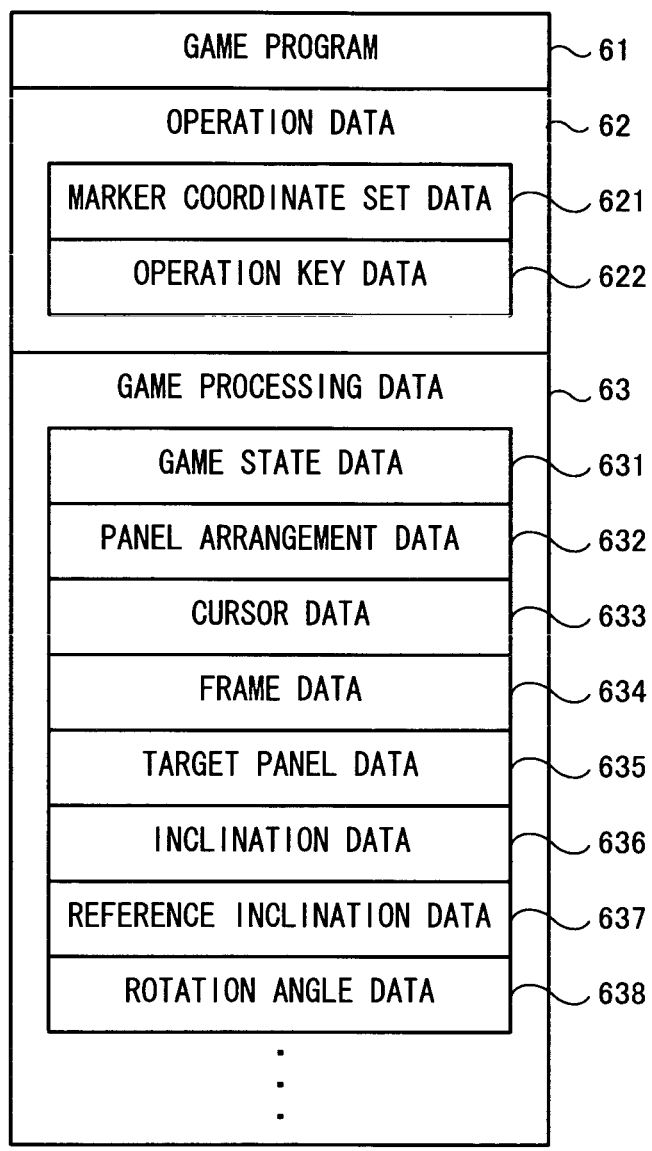
FIG. 12 shows main data stored on a main memory 13 of the game apparatus 3.

Next, program processing executed by the game apparatus 3 in this embodiment will be described. With reference to FIG. 12, main data used in the game processing will be described. FIG. 12 shows main data stored on the main memory 13 of the game apparatus 3. As shown in FIG. 12, the main memory 13 has stored thereon a game program 61, operation data 62, game processing data 63 and the like. The main memory 13 also has stored thereon image data of the panels, the cursor and the frame appearing in the puzzle game, data representing the remaining time and the point, another data necessary for the game processing, in addition to the data shown in FIG. 12.

Figure 13:
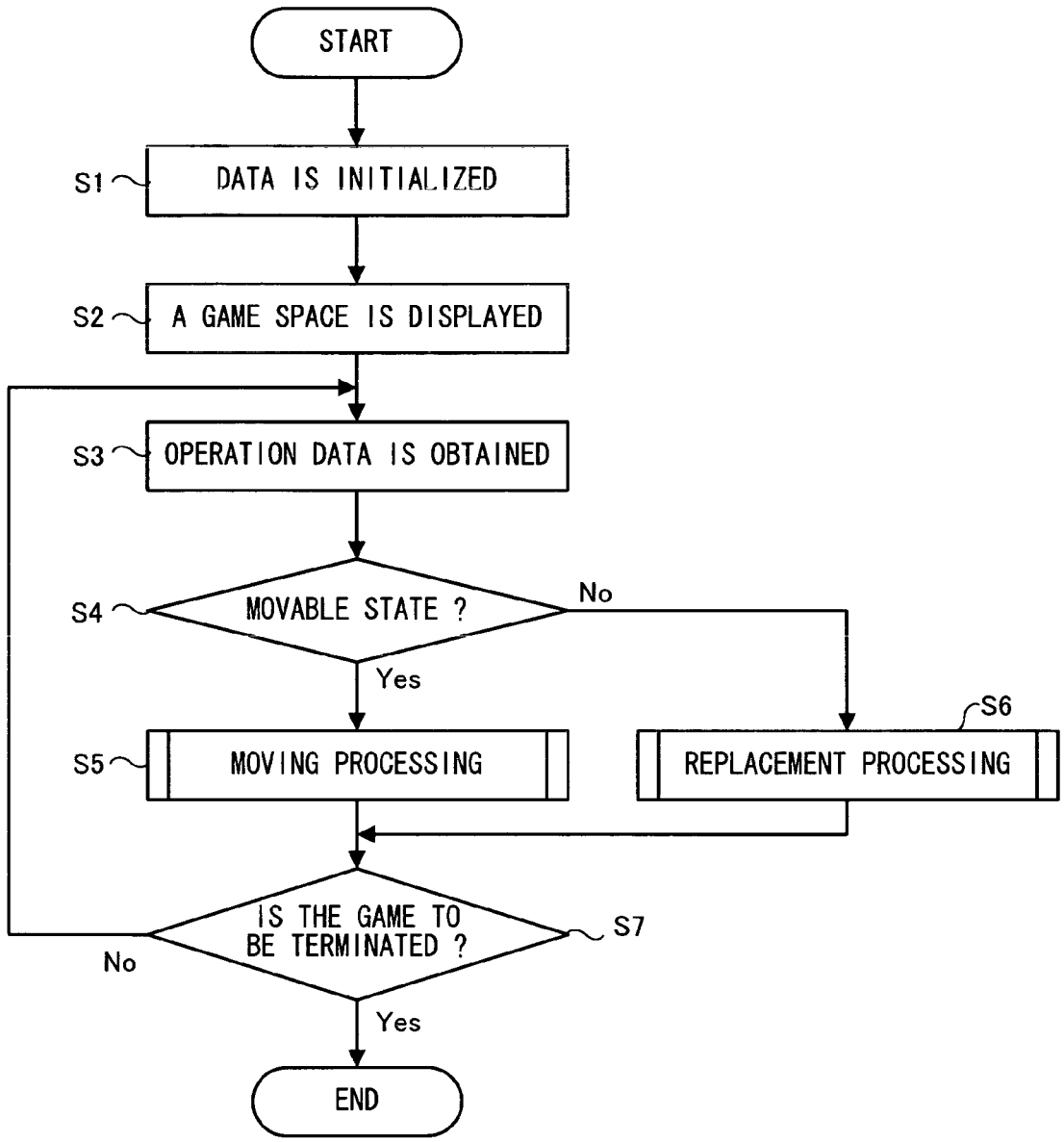
FIG. 13 is a main flowchart illustrating a flow of processing executed by the game apparatus 3.

The game program 61 is partially or entirely read from the optical disc 4 at an appropriate timing after the game apparatus 3 is turned on, and is stored on the main memory 13. The game program 61 includes programs necessary for executing the game processing described later (FIG. 13).

The operation data 62 is transmitted from the controller 7 to the game apparatus 3 and is stored on the main memory 13. The operation data 62 includes marker coordinate set data 621 and operation key data 622. The marker coordinate set data 621 represents a coordinate set calculated by the image processing circuit 41 of the imaging information calculation section 35, i.e., the marker coordinate set described above. The marker coordinate set is represented by a coordinate system used for indicating positions in a plane corresponding to a taken image (the x-y coordinate system shown in FIG. 7). The operation key data 622 represents an input state on each of the operation buttons 32a through 32i (whether or not each of the operation buttons 32a through 32i is pressed). The operation data 62 may include acceleration data representing an acceleration (acceleration vector) detected by the acceleration sensor 37 when necessary.

The game processing data 63 is used for the game processing described later. The game processing data 63 includes game state data 631, panel arrangement data 632, cursor data 633, frame data 634, target panel data 635, inclination data 636, reference inclination data 637, and rotation angle data 638.

The game state data 631 represents a current game state. As described above, in this embodiment, there are two game states, i.e., the movable state and the replaceable state. The game state data 631 represents either the movable state or the replaceable state.

The panel arrangement data 632 represents an arrangement of 30 panels. Specifically, the panel arrangement data 632 represents the type of the panel (the number assigned thereto) located at the i'th row ($1 \leq i \leq 6$) and the j'th column ($1 \leq j \leq 5$).

The cursor data 633 represents the position of the cursor 52 on the screen, i.e., the indicated position by the controller 7. The cursor data 633 is calculated based on the marker coordinate set data 621.

The frame data 634 represents the position of the frame 53 on the screen. In this embodiment, the frame data 634 represents the coordinate set of the central position of the frame 53 (the position of the mark 54).

The target panel data 635 represents four panels which are the target panels among the 30 panels displayed on the screen. In this embodiment, data on the row number and the column number of the position of, for example, the top left panel among the four target panels is stored as the target panel data 635. For example, in the state shown in FIG. 9, the target panel data 635 represents "the third row and the third column".

The inclination data 636 represents a direction which changes in accordance with the inclination of the controller 7. In this embodiment, the direction represented by the inclination data 636 is represented by an X'-Y'-Z' coordinate system (see FIG. 18), which is a virtual three-dimensional coordinate system. Specifically, such a direction is represented by a vector in an X'-Y' plane in the X'-Y'-Z' coordinate system. The inclination data 636 is calculated based on the marker coordinate set data 621.

The reference inclination data 637 represents a direction corresponding to the inclination of the controller 7 when the replacement operation is started (i.e., when the game state is transferred from the movable state to the replaceable state). The reference inclination data 637 is data on a vector in the X'-Y' plane in the X'-Y'-Z' coordinate system, like the inclination data 636. The reference inclination data 637 is the inclination data calculated when the replacement operation is started.

The rotation angle data 638 represents a rotation angle of the target panels in the replaceable state. The rotation angle θ of the target panels is represented with a value in the range of $-270° \leq \theta \leq 270°$, where the 0° is the direction of the panels when the replacement operation is started and the clockwise direction has a positive value. In other embodiments, the rotation angle of the target panels may be represented by a vector.

Next, the processing executed by the game apparatus 3 will be described in detail with reference to FIG. 13 through FIG. 18. FIG. 13 is a main flowchart illustrating a flow of the processing executed by the game apparatus 3. When the game apparatus 3 is turned on, the CPU 10 of the game apparatus 3 executes a start program stored on the boot ROM (not shown) to initialize each unit such as the main memory 13. The game program stored on the optical disc 4 is read into the main memory 13, and the CPU 10 starts the execution of the game program. The flowchart shown in FIG. 13 illustrates the processing executed after the above-described processing is completed.

First in step S1, data used in the subsequent processing is initialized. Specifically, data representing the "movable state" is stored on the main memory 13 as the game state data 631. The reason is that in this embodiment, the game state immediately after the game is started is the movable state. Data representing an initial position of each panel at the start of the game is stored on the main memory 13 as the panel arrangement data 632. The initial position of each panel may be predetermined by the game program 61 or may be determined randomly.

Next in step S2, a game space is constructed and displayed on the monitor 2. The CPU 10 constructs a three-dimensional or two-dimensional game space and locates the 30 panels in accordance with the panel arrangement data 632. A game image representing the game space constructed in this manner is generated and displayed on the monitor 2. After this, a processing loop of steps S3 through S7 is repeated frame by frame (except in the case where steps S18 and S19 are executed). Thus, the game proceeds.

In step S3, the CPU 10 obtains the operation data 62 from the controller 7. In more detail, the controller 7 transmits the operation data 62 to the game apparatus 3 at a predetermined time interval (for example, at an interval of a time period within a frame), and the CPU 10 stores the transmitted operation data 62 on the main memory 13. The operation data 62 includes at least the marker coordinate set data 621 and the operation key data 622. The CPU 10 stores the marker coordinate set data 621 and the operation key data 622 on the main memory 13. Since the processing in step S3 is executed at an interval of a predetermined time period, the game apparatus 3 can obtain the marker coordinate set data 621 and the operation key data 622 sequentially.

Next in step S4, the CPU 10 determines whether or not the current game state is the movable state. The determination in step S4 is executed by referring to the game state data 631 stored on the main memory 13. When the game state data 631 represents the movable state, the determination result in step S4 is positive; whereas when the game state data 631 represents the replaceable state, the determination result in step S4 is negative. When the determination result in step S4 is positive, processing in step S5 is executed. By contrast, when the determination result in step S4 is negative, processing in step S6 is executed as described later.

In step S5, the moving processing is executed. The moving processing is the game processing executed in the movable state. By the moving processing, the cursor 52 or the frame 53 is moved in accordance with the moving operation by the player. Hereinafter, the moving processing will be described in detail with reference to FIG. 14.

Figure 14:
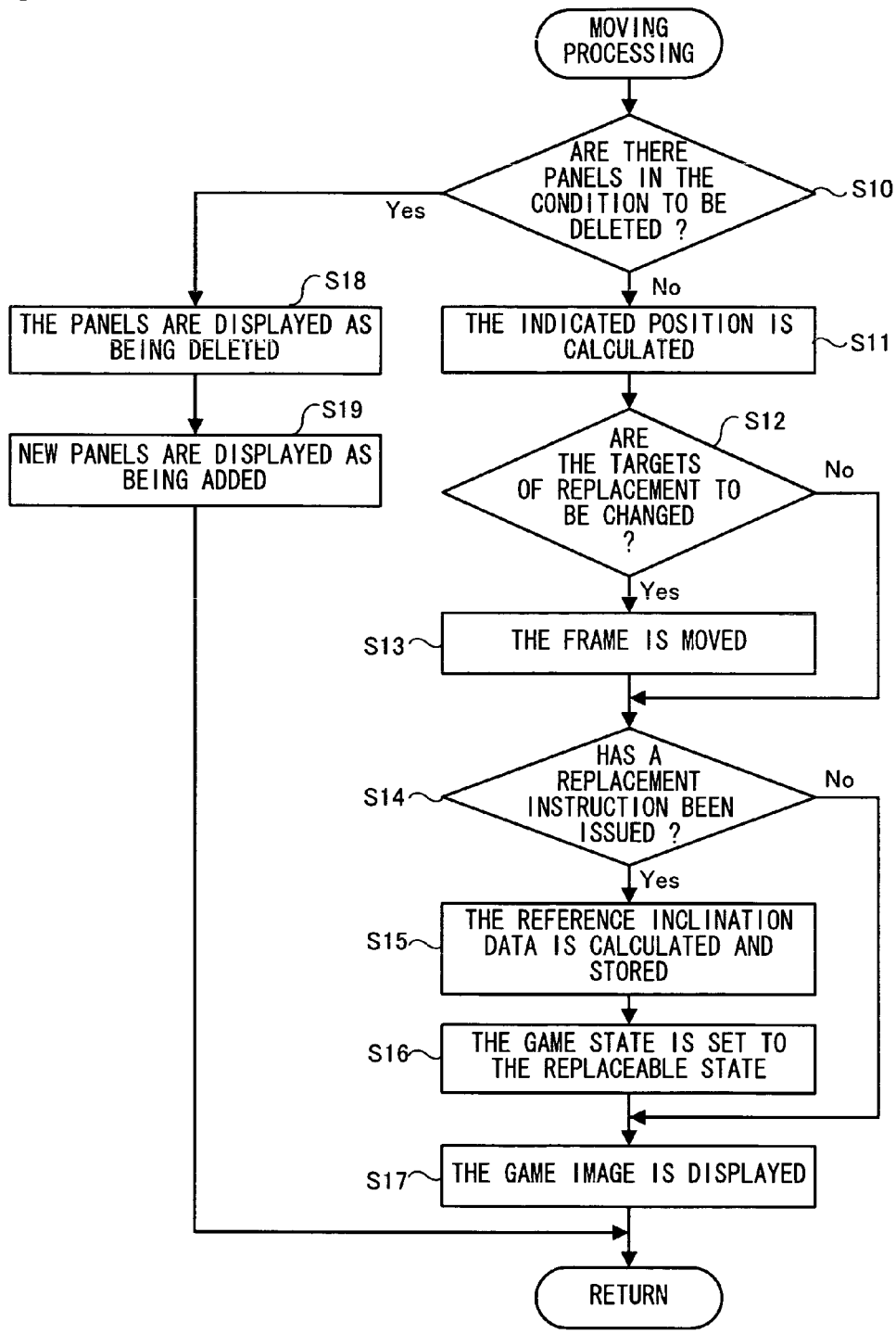
FIG. 14 is a flowchart illustrating moving processing (step S5) shown in FIG. 13 in detail.

FIG. 14 is a flowchart illustrating the moving processing shown in FIG. 13 (step S5) in detail. The moving processing is executed as follows. First in step S10, the CPU 10 determines whether or not there are panels which are in the condition to be deleted. The determination in step S10 is executed by referring to the panel arrangement data 632 stored on the main memory 13. When the panel arrangement data 632 indicates that at least three panels of the same type are arranged in a row direction or a column direction, the determination result in step S10 is positive. Otherwise, the determination result in step S10 is negative. When the determination result in step S10 is positive, processing in step S18 is executed as described later. By contrast, when the determination result in step S10 is negative, processing in step S11 is executed.

In step S11, the position of the cursor 52 on the screen, i.e., the indicated position by the controller 7, is calculated. Specifically, the CPU 10 calculates the indicated position by the controller 7 based on the marker coordinate sets represented by the marker coordinate set data 623 stored on the main memory 13. Data on the calculated indicated position is stored on the main memory 13 as the cursor data 633. Any method is usable for calculating the indicated position by the controller 7. For example, the following method is usable.

Now, one exemplary method for calculating the indicated position by the controller 7 will be described. The marker coordinate set data 623 obtained from the controller 7 represents two marker coordinate sets of two markers 8a and 8b. Therefore, the CPU 10 first calculates an intermediate point between the two marker coordinate sets from the marker coordinate set data 623. The position of the intermediate point is represented by the x-y coordinate system used for indicating positions in a plane corresponding the taken image. Next, the intermediate point between the marker coordinate sets is moved on an arc around the central position of the taken image, such that a vector connecting the two marker coordinate sets is parallel to the y axis. This is performed to correct the position of the intermediate point. According to the present invention, the inclination of the controller 7 is used as input data. Therefore, the above-mentioned correction is required in order to correctly calculate the indicated position even when, for example, the controller 7 is inclined. Next, the CPU 10 converts the coordinate set representing the corrected position of the intermediate point into a coordinate set in a coordinate system used for indicating positions on the screen of the monitor 2 (an x'-y' coordinate system). This conversion can be performed using a function for converting a coordinate set of an intermediate point calculated from a taken image into a coordinate set on the screen corresponding to the actual indicated position by the controller 7 when the taken image is obtained. By the conversion, the indicated position by the controller 7 and the position of the marker coordinate sets in the taken image move in the opposite direction to each other. Therefore, the conversion is performed such that a position in a top area and a position in a bottom area, or a position in a left area and a position in a right area, are inverted to each other. The position represented by the x'-y' coordinate set which is calculated in this manner is the indicated position by the controller 7.

Next in step S12, the CPU 10 determines whether or not the replacement targets are to be changed, i.e., whether or not the frame 53 is to be moved. The determination in step S12 is executed by referring to the cursor data 633 and the frame data 634 stored on the main memory 13. When the position of the cursor 52 represented by the cursor data 633 is inside the frame 53 defined by the frame data 634, the determination result in step S12 is negative. By contrast, when the position of the cursor 52 represented by the cursor data 633 is outside the frame 53 defined by the frame data 634, the determination result in step S12 is positive. In this embodiment, the size of the frame 53 is predetermined. Therefore, once the central position of the frame 53 is specified by the frame data 634, the area size of the frame 53 can be calculated. When the determination result in step S12 is positive, processing in step S13 is executed. By contrast, when the determination result in step S12 is negative, processing in step S14 is executed.

In step S13, the frame 53 is moved. The CPU 10 moves the frame 53 leftward or rightward by one column, or upward or downward by one row, in accordance with the position of the cursor 52 represented by the cursor data 633. When the cursor 52 is left to the frame 53, the frame 53 is moved leftward by one column, and when the cursor 52 is right to the frame 53, the frame 53 is moved rightward by one column. When the cursor 52 is above the frame 53, the frame 53 is moved upward by one row, and when the cursor 52 is below the frame 53, the frame 53 is moved downward by one row. The content of the frame data 634 stored on the main memory 13 is updated to represent the position of the post-movement frame 53 and is stored. The content of the target panel data 635 is updated to represent four panels surrounded by the post-movement frame 53 and is stored. By steps S13 and S14, panels to be selected as the replacement targets among the 30 panels have been updated.

In step S14, the CPU 10 determines whether or not the player has issued a replacement instruction. Specifically, the CPU 10 determines whether or not the replacement instruction button (the B button 32d in this embodiment) is pressed. The determination in step S14 is executed by referring to the operation key data 622 stored on the main memory 13. When the operation key data 622 indicates that the B button 32d is pressed, the determination result in step S14 is positive. When the operation key data 622 indicates that the B button 32d is not pressed, the determination result in step S14 is negative. When the determination result in step S14 is positive, processing in step S15 is executed. By contrast, when the determination result in step S14 is negative, the processing in steps S15 and S16 is skipped and processing in step S17 is executed.

In step S15, the reference inclination data 637 is calculated and stored on the main memory 13. Specifically, the direction corresponding to the inclination of the controller 7 is calculated based on the operation data 62 obtained when the replacement instruction was issued. In this embodiment, this direction is represented as a vector in the X'-Y'-Z' coordinate system, which is a virtual coordinate system. Hereinafter, a method for calculating the reference inclination data 637 will be described in detail with reference to FIG. 15 and FIG. 16.

Figure 15:
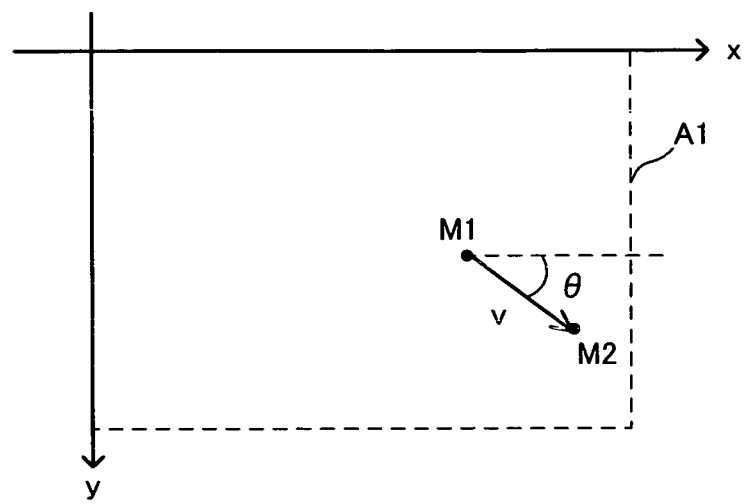
FIG. 15 shows a position of a marker coordinate set in a taken image obtained in a certain state.
Figure 16:
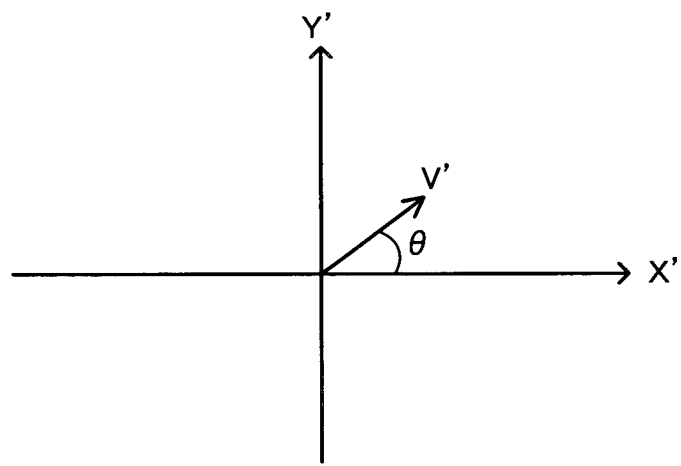
FIG. 16 shows a vector V' obtained by converting a vector v shown in FIG. 15.

FIG. 15 shows positions of marker coordinate sets in a taken image obtained in one state. It is assumed that two marker coordinate sets representing positions M1 and M2 shown in FIG. 15 are calculated by the imaging information calculation section 35. The game apparatus 3 obtains data representing the marker coordinate sets of the positions shown in FIG. 15 from the controller 7 as the operation data 62. Then, the CPU 10 first calculates a vector v connecting the two marker coordinate sets. Which of the two markers is the start point of the vector and which is the end point is determined in accordance with a predetermined rule. For example, a marker coordinate set having a smaller value of x component may be set as the start point. An angle made by the calculated vector v and the x axis is represented as angle θ. Next, the CPU 10 converts the vector v in the x-y coordinate system into a vector V' in the X'-Y'-Z' coordinate system. The conversion is specifically performed such that the vector V' is in the X'-Y' plane (Z'=0) and that the angle made by the vector V' and the X' axis is the angle θ. The magnitude of the vector V' is 1. FIG. 16 shows the vector V' obtained by converting the vector v shown in FIG. 15. The vector V' obtained in this manner represents the inclination of the controller 7 and thus changes in accordance with the inclination of the controller 7. Hereinafter, the vector V' will be referred to as the "inclination vector". The inclination vector which is calculated when a replacement instruction is issued will be referred to as the "reference inclination vector".

In step S15, data on the reference inclination vector V' calculated in this manner is stored on the main memory 13 as the reference inclination vector data 637. In this embodiment, the panels are replaced based on the direction change in the inclination vector with respect to the direction of the reference inclination vector V' calculated in step S15, as described later in detail. After step S15, processing in step S16 is executed.

In step S16, the game state is set to the replaceable state. Specifically, the CPU 10 rewrites the content of the game state data 631 stored on the main memory 13 with data representing the replaceable state. As a result, in the next frame, the determination result in step S4 is positive (the processing in steps S3 through S7) and therefore the replacement processing in step S6 is executed. After step S16, processing in step S17 is executed.

In step S17, a game image is displayed on the monitor 2. The 30 panels are displayed in the arrangement represented by the panel arrangement data 632 stored on the main memory 13. The cursor 52 is displayed at the position represented by the cursor data 633, and the frame 53 is displayed at the position represented by the frame data 634 (see FIG. 9). The remaining time image 55 and the point image 56 are displayed. When the processing in step S17 is finished, the CPU 10 terminates the moving processing.

In step S18, the monitor 2 displays the three or more panels of the same type arranged in the row direction or the column direction being deleted. Next in step S19, the monitor 2 displays new panels being added to the positions from which the panels have been deleted. The display processing in steps S18 and S19 is preferably executed by displaying an animation over a plurality of frames. When the processing in step S19 is finished, the CPU 10 terminates the moving processing.

Returning to FIG. 13, in step S6, the replacement processing is executed. The replacement processing is the game processing executed in the replaceable state. By the replacement processing, the positions of the panels are replaced in accordance with the rotation operation by the player. Hereinafter, the replacement processing will be described in detail with reference to FIG. 17.

Figure 17:
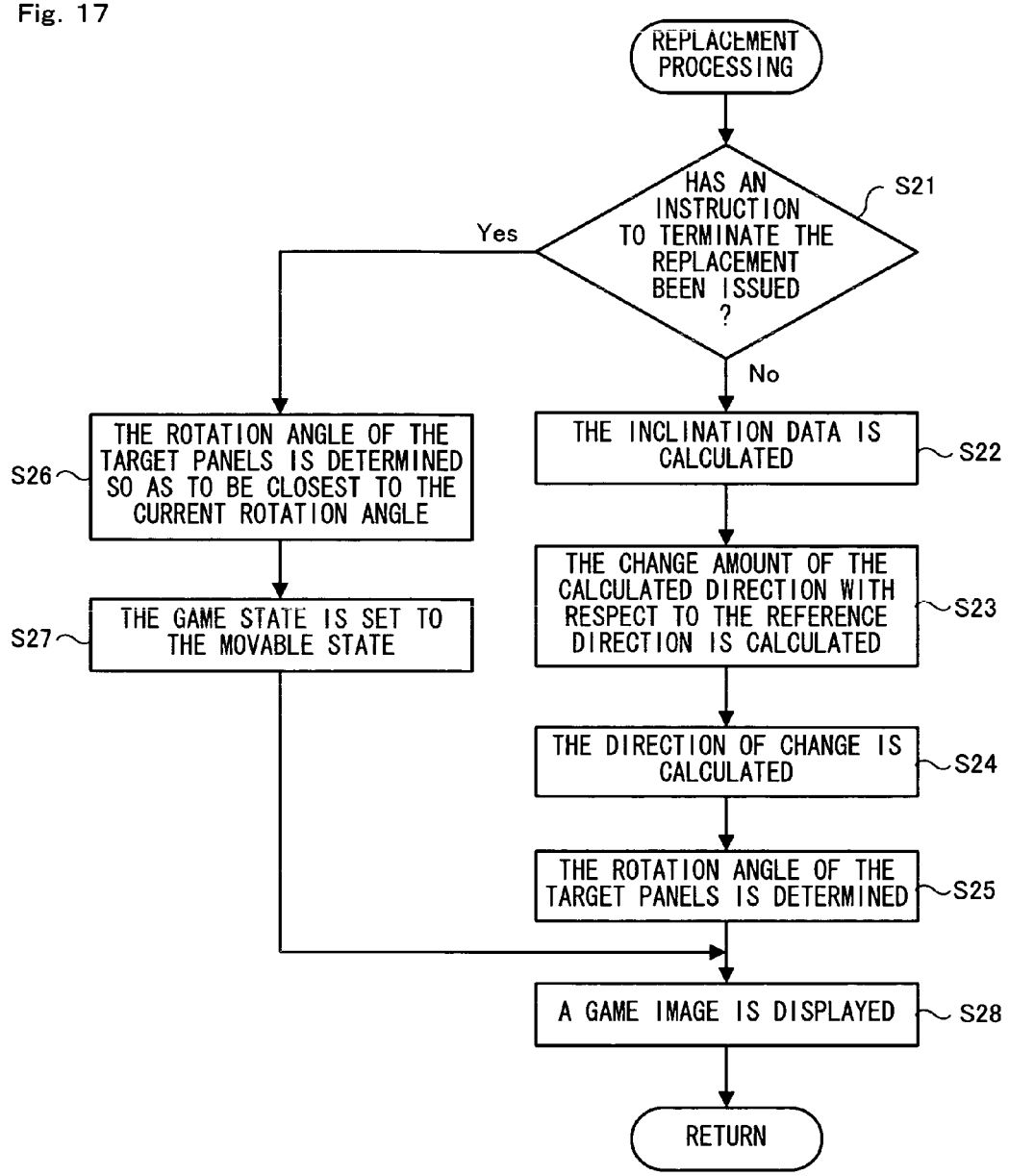
FIG. 17 is a flowchart illustrating replacement processing (step S6) shown in FIG. 13 in detail.

FIG. 17 is a flowchart illustrating the replacement processing shown in FIG. 13 (step S6) in detail. The replacement processing is executed as follows. First in step S21, the CPU 10 determines whether or not an instruction to terminate the replacement has been issued. Specifically, the CPU 10 determines whether or not an input to the replacement instruction button (the B button 32d in this embodiment) has been eliminated. The determination in step S21 is executed by referring to the operation key data 622 stored on the main memory 13. When the operation key data 622 indicates that the B button 32d is not pressed, the determination result in step S21 is positive. When the operation key data 622 indicates that the B button 32d is pressed, the determination result in step S21 is negative. When the determination result in step S21 is positive, processing in step S26 is executed as described later. By contrast, when the determination result in step S21 is negative, processing in step S22 is executed.

In step S22, data on the inclination vector V' representing the current inclination of the controller 7 (i.e., the inclination data 636) is calculated. The inclination data 636 is calculated using the marker coordinate set data 621 obtained in step S3 in the current frame and stored on the main memory 13. The method for calculating the inclination vector V' is the same as that described above regarding step S15. For calculating the inclination vector V' in step S22, a marker coordinate set, among the two marker coordinate sets, which is closer to the coordinate set used as the start point of the vector connecting the two marker coordinate sets in the immediately previous frame is used as the start point of the vector. Data on the calculated inclination vector V' is stored on the main memory 13 as the inclination data 636.

Next in step S23, a direction change amount of the inclination vector V' calculated in step S22 with respect to the direction of the reference inclination vector (reference direction) is calculated. The direction change amount is represented as an inner product of the inclination vector calculated in step S22 and the reference inclination vector. The CPU 10 calculates an inner product of the inclination vector calculated in step S22 and the reference inclination vector. In other embodiments, the angle (°) made by the direction of the inclination vector calculated in step S22 and the reference direction may be calculated as the change amount. The direction change amount represents a change amount in the inclination of the controller 7 from the state when the replacement instruction was issued. Namely, the processing in step S23 is executed in order to calculate the rotation amount of the controller 7 from the state when the replacement instruction was issued.

Figure 18:
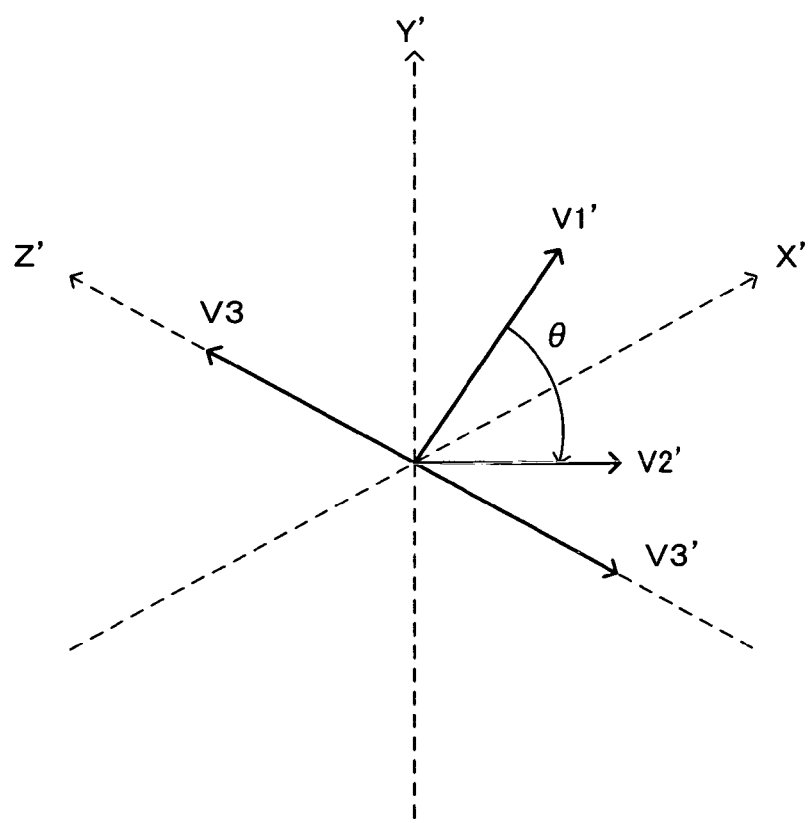
FIG. 18 shows processing in step S24.

Next in step S24, the direction of change of the inclination vector calculated in step S22 with respect to the reference direction is calculated. Specifically, the CPU 10 calculates an outer product of the reference inclination vector and the inclination vector calculated in step S22. FIG. 18 shows the processing in step S24. In FIG. 18, V1' is the reference inclination vector, and V2' is the inclination vector calculated in step S22. As described above, the vector V1' and the vector V2' are vectors in the X'-Y' plane. In FIG. 18, the inclination vector has rotated clockwise as seen in the positive Z'-axis direction from the state when the replacement instruction was issued. In this state, the outer product of the vector V1' and the vector V2' is vector V3'. By contrast, in the case where the inclination vector has rotated counterclockwise as seen in the positive Z'-axis direction from the state when the replacement instruction was issued, the outer product of the vector V1' and the vector V2' is vector V3'. In other words, when the direction of change is clockwise, the vector of the outer product is in the positive Z'-axis direction; whereas when the direction of change is counterclockwise, the vector of the outer product is in the negative Z'-axis direction. The direction of change can be found based on whether the Z' component of the vector of the outer product calculated as described above has a positive value or a negative value. Namely, the rotation direction of the controller 7 can be found based on whether the Z' component of the vector of the outer product has a positive value or a negative value.

Next in step S25, the rotation angle of the target panels is determined. Specifically, the CPU 10 first calculates the angle obtained when the target panels are rotated in the direction calculated in step S24 by the change amount calculated in step S23. In this embodiment, a range of $\pm\alpha°$ with respect to a predetermined center angle (0°, 90°, 180° or 270°) is set as a play range. When the above-calculated angle has a value within the play range, the CPU 10 determines the center angle corresponding to the play angle as the rotation angle of the target panels. When the above-calculated angle does not have a value within the play range, the CPU 10 determines the above-calculated angle as the rotation angle. For example, when the above-calculated angle has a value within the range of 90°±α°, the rotation angle is determined to 90°. Thus, the player can rotate the target panels by the center angle, with no need to operate the controller 7 so as to accurately correspond to the center angle. This improves the maneuverability of the game. Data on the angle determined in step S25 is stored on the main memory 13 as the rotation angle data 638. After step S25, processing in step S28 is executed as described later, and a game image of the target panels which have rotated by the above-determined angle is displayed on the monitor 2.

Figure 25:
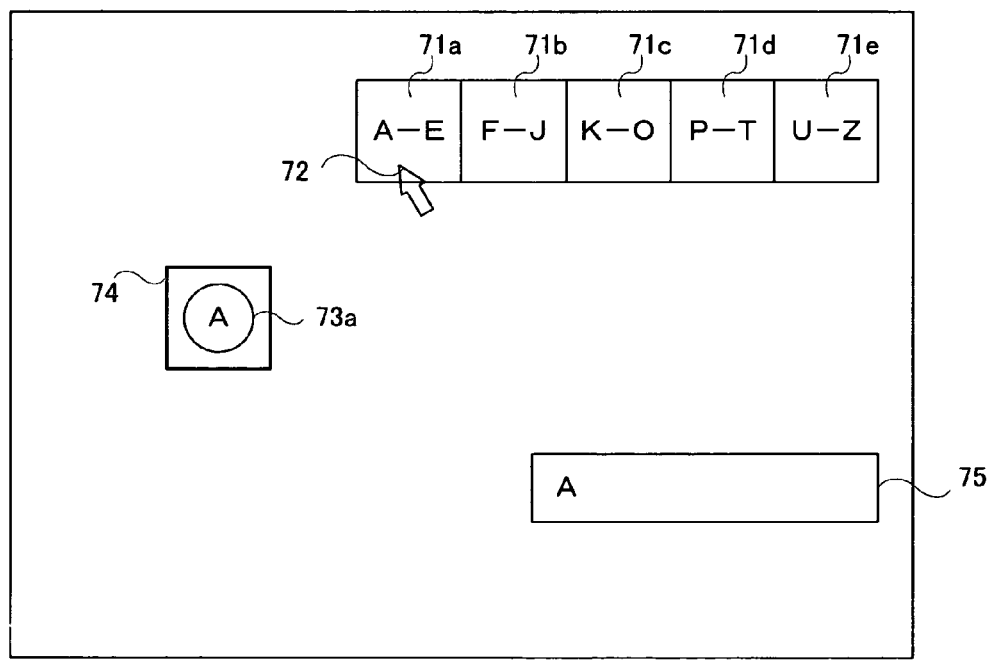
FIG. 25 shows a game image in still another example of the first modified example.

As shown in FIG. 25, in this embodiment, the target panels are replaced based on the direction change amount represented by the inclination data 636 during a predetermined time period (from when the game state was set to the replaceable state until the current time). Namely, the target panels are replaced based on the difference between the reference inclination vector and the current inclination vector. In other embodiments, the target panels may be replaced based only on the value of the current inclination vector, as described later in a first modified example.

In step S26, the rotation angle of the target panels is determined so as to be the center angle closest to the current rotation angle of the target panels. Specifically, the CPU 10 selects the center angle closest to the current rotation angle of the target panels among the center angles (0°, 90°, 180° and 270°), and determines the selected center angle as the current rotation angle of the target panels. The current rotation angle of the target panels is represented by the rotation angle data 638 currently stored on the main memory 13. In this embodiment, the current rotation angle of the target panels is the rotation angle determined in step S25 in the immediately previous frame. In other embodiments, the current rotation angle of the target panels may be a rotation angle obtained by executing the processing in steps S22 through S25 before step S26 in the current frame. Data on the rotation angle determined in step S25 is stored on the main memory 13 as the rotation angle data 638. Since the rotation angle is now determined, the content of the panel arrangement data 632 is updated to represent the replaced positions of the panels based on the rotation angle.

Next in step S27, the game state is set to the movable state. Specifically, the CPU 10 rewrites the content of the game state data 631 stored on the main memory 13 with the data representing the movable state. Thus, in the next frame, the determination result in step S4 is negative, and therefore the replacement processing in step S5 is executed.

After step S25 or S27, the processing in step S28 is executed. In step S28, a game image in the replaceable state is displayed. The target panels are displayed as being rotated by the angle represented by the rotation angle data 638 stored on the main memory 13 (see FIG. 10). In this embodiment, the frame 53 is also displayed as being rotated by the same angle as the target panels. When the processing in step S28 is finished, the CPU 10 terminates the replacement processing.

Returning to FIG. 13, after step S5 or S6, processing in step S7 is executed. In step S7, the CPU 10 determines whether or not to terminate the game. The determination in step S7 Is executed based on whether or not the time of the game is up. When the determination result in step S7 is negative, the processing is returned to step S3 and the processing in steps S3 through S7 is repeated until it is determined that the game is to be terminated. By contrast, when the determination result in step S7 is positive, the CPU 10 terminates the processing shown in FIG. 13. The game processing in this embodiment is executed as described so far by the game apparatus 3.

As described above, in this embodiment, when the player issues a replacement instruction, the game state is transferred from the movable state to the replaceable state (step S16), which allows the target panels to be rotated in accordance with the inclination of the controller 7 (steps S22 through S25). When the player issues an instruction to terminate the replacement (Yes in step S21), the target panels are put into the state of being rotated at 0°, 90°, 180° or 270° clockwise or counterclockwise (step S26) and the game state is transferred from the replaceable state to the movable state (step S27). By the replacement processing, each of the target panels displayed at one position is replaced with another panel (a target panel which was displayed at another position). In this embodiment, the player can enjoy a novel operation of replacing the objects (panels) displayed on the screen by rotating the controller 7 itself.

In this embodiment, where the target panels are rotated at 90° in one cycle of replacement processing, the game apparatus 3 executes replacement processing by a number of cycles corresponding to the change amount in the inclination of the controller 7. Thus, the player can cause a plurality of cycles of replacement processing to be executed easily.

In this embodiment, in the replacement processing, the rotation angle of the target panels is calculated in each frame (steps S22 through S25), and thus the rotation angle of the target panels is changed frame by frame. Owing to this, an animation of the target panels rotating in accordance with the inclination of the controller 7 is displayed. In other embodiments, the target panels may be replaced in accordance with the inclination of the controller 7, and it is not absolutely necessary to display the animation.

In this embodiment, four panels are used as the target panels, and the four objects are replaced in accordance with the inclination of the controller 7. The number of the target panels is arbitrary. For example, two panels arranged in the row direction or column direction may be used as the target panels, and the positions of these two panels may be replaced.

In this embodiment, the positions of a plurality of objects (panels) displayed on the screen are replaced. The present invention is applicable to various embodiments in which objects displayed on the screen are replaced with other objects. Hereinafter, other modified game examples will be described.

First Modified Example

Figure 19:
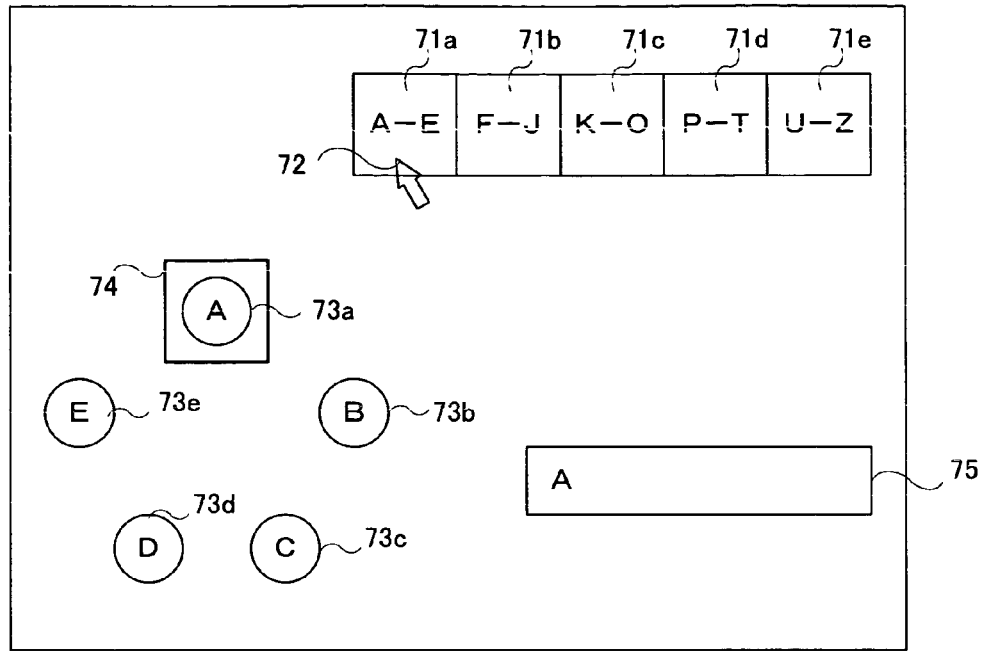
FIG. 19 shows an exemplary game image in a first modified example.

In a first modified example, the present invention is applied for inputting letters. FIG. 19 shows an exemplary game image in the first modified example. The game image shown in FIG. 19 is displayed on the screen of the monitor 2 for inputting alphabetical letters from A through Z. On the screen, candidate letter group images 71a through 71e, a cursor 72, candidate letter images 73a through 73e, a frame 74, and an input letter image 75 are displayed. In the first modified example, the game image shown in FIG. 19 is displayed, for example, at the start of the game or when a predetermined conditions is fulfilled during the game.

With reference to FIG. 19, the cursor 72, which is operable by the player, is used by the player to indicate a desired position on the screen. The game apparatus 3 displays the cursor 72 at an indicated position by the controller 7. The method for calculating the position of the cursor 72 on the screen is the same as described above.

The candidate letter group images 71a through 71e displayed in an upper part of the screen each represent a group of candidate letters (candidate letter group). For example, the candidate letter group image 71a labeled "A-E" represents five candidate letters of "A" through "E". A "candidate letter" refers to a letter displayed on the screen as a letter which can be input. For a letter selected as a candidate letter, a corresponding image (a candidate letter image described later) is to be displayed on the screen.

The candidate letter images 73a through 73e each represent a letter currently selected as a candidate letter. In the state shown in FIG. 19, five letters of "A" through "E" are selected as the candidate letters and can be input. In the first modified example, the candidate letter images 73a through 73e are arranged in a ring. The positions of the candidate letter images 73a through 73e can be replaced by changing the inclination of the controller 7.

The frame 74 represents a letter as an input target among the candidate letters. The letter of the candidate letter image surrounded by the frame 74 is the input target. For example, in the state shown in FIG. 19, when the player presses a predetermined input determination button (for example, the A button 32i) on the controller 7, "A", which is the candidate letter surrounded by the frame 74, is input.

The input letter image 75 represents the letter (letter string) which has already been input. In the state shown in FIG. 19, the input letter image 75 shows that the letter of "A" has already been input.

When the game image shown in FIG. 19 is displayed, the player first performs a first operation using the controller 7. The first operation is performed in order to select a candidate letter group. Specifically, the player moves the cursor 72 so as to overlap one desired image among the candidate letter group images 71a through 71e. Next, the player presses a predetermined candidate letter determination button (for example, the B button 32d). By this operation, the game apparatus 3 recognizes that the candidate letter group image indicated by the cursor 72 has been selected, and changes the letter group selected as the candidate letters to a letter group corresponding to the indicated candidate letter group image. In the state shown in FIG. 19, for example, when the candidate letter group image 71b labeled "F-J" is selected, the five letters of "A" through "E" are replaced with the five letters of "F" through "J" selected as the candidate letters. Thus, the candidate letter images of "F" through "J" are displayed in place of "A" through "E". As described above, for inputting a desired letter, the player first performs the first operation of selecting the candidate letter group image using the cursor 72 in order to display the letter to be input as a candidate letter.

Figure 20:
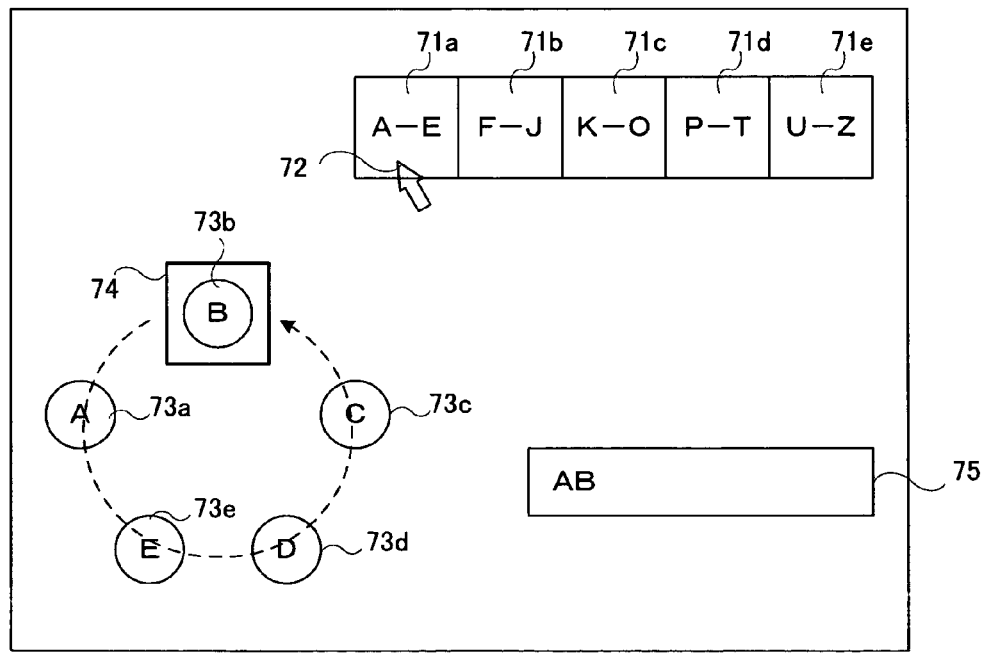
FIG. 20 shows a game image after positions of candidate letter images 73a through 73e are replaced from the state shown in FIG. 19.

Next, the player performs a second operation of determining a letter to be input among the candidate letters. In the first modified example, the game apparatus 3 replaces the positions of the candidate letter images 73a through 73e in accordance with the inclination of the controller 7. For example, when the controller 7 is rotated clockwise around an axis in the longitudinal direction from the state shown in FIG. 19, the game apparatus 3 replaces the positions of the candidate letter images 73a through 73e as shown in FIG. 20. FIG. 20 shows a game image after the positions of the candidate letter images 73a through 73e are replaced from the state shown in FIG. 19. In FIG. 20, the positions of the candidate letter images 73a through 73e are replaced in a circulating manner. Namely, the candidate letter images 73a through 73e are moved counterclockwise by one position.

As described above, the player can replace the candidate letter image surrounded by the frame 74, i.e., the letter as the input target, by changing the inclination of the controller 7. When the desired candidate letter is surrounded by the frame 74, the player presses the predetermined input determination button (for example, the A button 32i). Then, the game apparatus 3 recognizes that the selected letter is input and adds the letter to the input letter image 75. For example, in FIG. 20, the letter of "B" is added from the state shown in FIG. 19.

Figure 21:
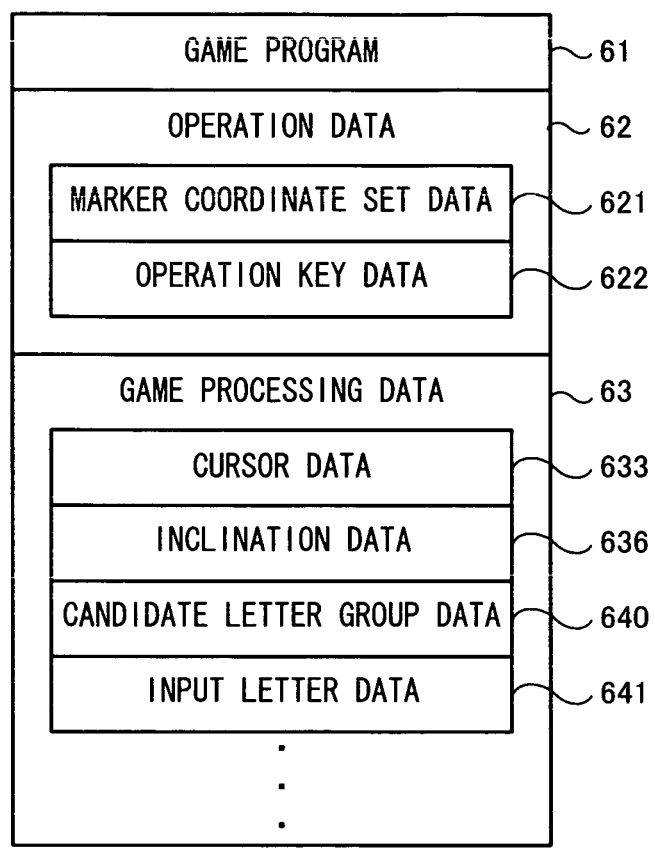
FIG. 21 shows main data stored on the main memory 13 of the game apparatus 3 in the first modified example.

FIG. 21 shows main data stored on the main memory 13 of the game apparatus 3 in the first modified example. As shown in FIG. 21, the main memory 13 has stored thereon a game program 61, operation data 62, game processing data 63 and the like. In FIG. 21, identical data to that described with reference to FIG. 12 in the above-described embodiment will bear identical reference numeral thereto, and detailed descriptions thereof will be omitted. Hereinafter, with reference to FIG. 21, mainly the differences from the data shown in FIG. 12 will be described.

In the first modified example, the game processing data 63 includes cursor data 633, inclination data 636, candidate letter group data 640, and input letter data 641. The cursor data 633 and the inclination data 636 are substantially the same as those in the above-described embodiment.

The candidate letter group data 640 represents the current candidate letter group, i.e., a letter group currently selected as the candidate letters. The candidate letter group data 640 is represented in the form of, for example, an array. The letter stored at the beginning of the array is the current input target, and the other letters in the candidate letter group are stored at the second and the subsequent positions in the array in the alphabetical order. After the last letter of the candidate letter group in the alphabetical order, the first letter of the candidate letter group in the alphabetical order is stored, and then the letters are again stored in the alphabetical order. For example, in the case where the candidate letter group includes "F" through "J", and the current input target is "H", the candidate letters are stored in the order of "H", "I", "J", "F" and "G".

The input letter data 641 represents the letter (letter string) which has already been input. The input letter image 75 shown in FIG. 19 represents the letter represented by the input letter data 641.

Figure 22:
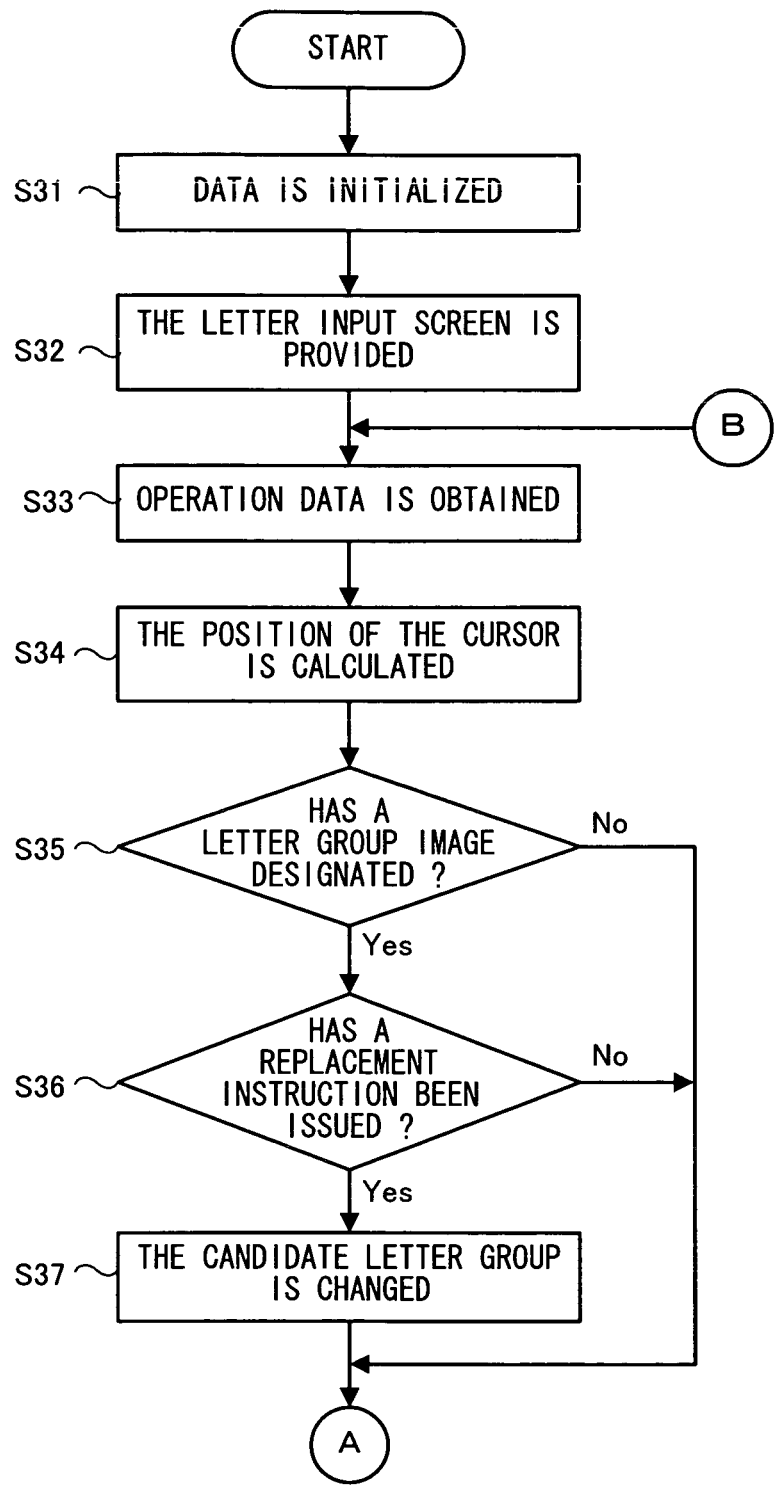
FIG. 22 is a main flowchart illustrating a flow of processing executed by the game apparatus 3 in the first modified example.
Figure 23:
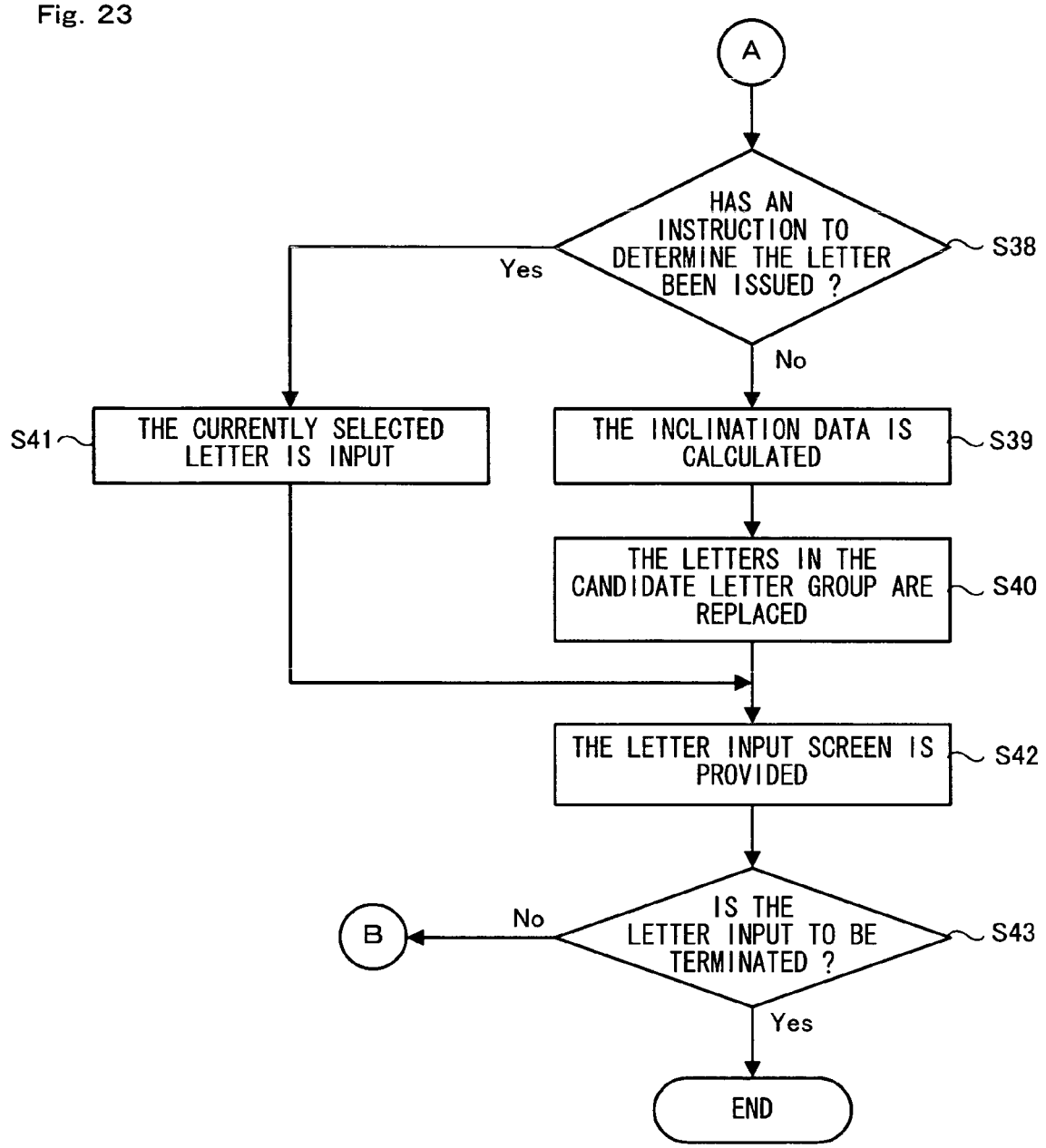
FIG. 23 is a main flowchart illustrating the flow of processing executed by the game apparatus 3 in the first modified example.

Next, with reference to FIG. 22 and FIG. 23, processing executed by the game apparatus 3 in the first modified example will be described in detail. FIG. 22 and FIG. 23 show a main flowchart illustrating a flow of processing executed by the game apparatus 3 in the first modified example. The processing of the flowchart shown in FIG. 22 and FIG. 23 is started, for example, at the start of the game or when a predetermined condition is fulfilled during the game.

First in step S31, the data used for the subsequent processing is initialized. Specifically, the content of the candidate letter group data 640 and the content of the input letter data 641 are initialized it is assumed here that in an initial state, the letters of "A" through "E" are set as candidate letter group and "A" is set as the input target. Therefore, data representing "'A', 'B', 'C', 'D' and 'E'" is stored on the main memory 13 as the candidate letter group 640.

Next in step S32, a game space is constructed and displayed on the monitor 2. The CPU 10 generates a game image as shown in FIG. 19 and displays the game image on the monitor 2. After this, a processing loop of steps S33 through S43 is repeated frame by frame. Thus, the game proceeds.

In step S33, the CPU 10 obtains the operation data 62 from the controller 7. The processing in step S33 is substantially the same as that in step S3 described above. Next in step S34, the position of the cursor 72 on the screen, i.e., the indicated position by the controller 7, is calculated. The processing in step S34 is substantially the same as that in step S11 described above.

In step S35, the CPU 10 determines whether or not one of the candidate letter group images 71a through 71e has been designated. Specifically, the CPU 10 determines whether or not the position of the cursor 72 calculated in step S34 overlaps one of the candidate letter group images 71a through 71e. When it is determined that the position of the cursor 72 overlaps one of the candidate letter group images 71a through 71e, processing in step S36 is executed. By contrast, when it is determined that 6 the position of the cursor 72 overlaps none of the candidate letter group images 71a through 71e, the processing in steps S36 and S37 is skipped and processing in step S38 is executed.

In step S36, the CPU 10 determines whether or not an input designating a candidate letter has been made, i.e., whether or not the predetermined candidate letter determination button (for example, the B button 32d) is pressed. The processing in step S36 is substantially the same as that in step S14 described above. When the determination result in step S36 is positive, processing in step S37 is executed. By contrast, when the determination result in step S36 is negative, the processing in step S37 is skipped and the processing in step S38 is executed.

In step S37, the candidate letter group is changed. Specifically, the CPU 10 sets the candidate letter group corresponding to the candidate letter group image determined to overlap the cursor 72 in step S35 as the newly selected candidate letter group. The CPU 10 stores the array data representing the newly selected candidate letters on the main memory 13 as the candidate letter group data 640. At this point, among the newly selected candidate letters, the first letter in the alphabetical order is stored at the beginning of the array. By the processing in step S37, the objects (candidate letter images) selected as the replacement targets are changed.

In step S38, the CPU 10 determines whether or not an instruction to determine the letter to be input has been issued, i.e., whether the predetermined input determination button (for example, the A button 32i) is pressed. The specific processing in step S38 is similar to the processing in step S14. When the determination result in step S38 is positive, processing in step S41 is executed. By contrast, when the determination result in step S38 is negative, processing in step S39 is executed.

In step S39, data on the inclination vector representing the inclination of the controller 7 (i.e., the inclination data 636) is calculated. The processing in step S39 is substantially the same as that in step S22.

In step S40, the letters in the candidate letter group are replaced based on the inclination data 636 calculated in step S39. The letters in the candidate letter group can be replaced as follows, for example. The CPU 10 determines the letter to be stored at the beginning of the array of the candidate letter group data 640 based on the direction of the inclination vector. More specifically, where the direction of the inclination vector is represented by an angle in the range of 0° to 360°, the candidate letter image is determined based on the following rule.

When the direction is 0° or greater but less than 72°: the first candidate letter in the alphabetical order (for example, "A");

When the direction is 72° or greater but less than 144°: the second candidate letter in the alphabetical order (for example, "B");

When the direction is 144° or greater but less than 216°: the third candidate letter in the alphabetical order (for example, "C");

When the direction is 216° or greater but less than 288°: the fourth candidate letter in the alphabetical order (for example, "D"); and When the direction is 288° or greater but less than 360°: the fifth candidate letter in the alphabetical order (for example, "E").

By determining the letter to be stored at the beginning of the array based on the above-mentioned correspondence, the order of the letters in the array cane determined. In the first modified example, when the candidate letter group image 71e is selected, there are six candidate letters of "U" through "Z". Therefore, a different correspondence from the above needs to be used.

In step S40, the direction of the inclination vector is represented by an angle with respect to the predetermined reference direction (0°). In other modified examples, the direction of the inclination vector may be represented by an angle with respect to the direction of the inclination vector at a predetermined timing (for example, the timing at which the candidate letter group was selected) as in the above-described embodiment.

In step S41, the letter as the current input target is added to the letter (letter string) which has already been input. Namely, the CPU 10 updates the content of the input character data 641 so as to add data on the letter stored at the beginning of the array represented by the candidate letter group data 640 to the data on the letters included in the input letter data 641.

After step S40 or S41, processing in step S42 is executed. In step S42, a letter input screen is provided on the monitor 2. At this point, the candidate letter image corresponding to the letter stored at the beginning of the array represented by the candidate letter group data 640 stored on the main memory 13 is displayed at the position surrounded by the frame 74. The candidate letter images corresponding to the other letters included in the array are arranged in a ring in accordance with the order of the array (for example, clockwise) (see FIG. 19). Thus, by replacing the letters in the array represented by the candidate letter group data 640, the objects (candidate letter images) displayed on the screen can be replaced.

Next in step S43, the CPU 10 determine whether or not to terminate the letter input. For example, the CPU 10 terminates the letter input when the player instructs to terminate the letter input. When the determination result in step S43 is negative, the processing is returned to step S33 and the processing in steps S33 through S43 is repeated until it is determined that the letter input is to be terminated. By contrast, when the determination result in step S43 is positive, the CPU 10 terminates the processing shown in FIG. 22 and FIG. 23. The game processing in the first modified example is executed as described so far by the game apparatus 3.

As described above, in the first modified example like in the above-described embodiment, the player can replace the positions of the candidate letter images by rotating the controller 7 around an axis in the longitudinal direction. The player can enjoy a novel operation of replacing the objects (candidate letter images) displayed on the screen by rotating the controller 7 itself.

In the first modified example, the candidate group to be displayed as the candidate letters can be changed by moving the cursor 72. Thus, the player can perform two different operations by changing the manner of handling the controller 7. The present invention allows the player to perform two different operations by simple handling of the controller 7, and also to select candidate letters at high speed from a large selection by combining the two operations. Thus, the present invention provides a highly maneuverable letter input method to the player.

Figure 24:
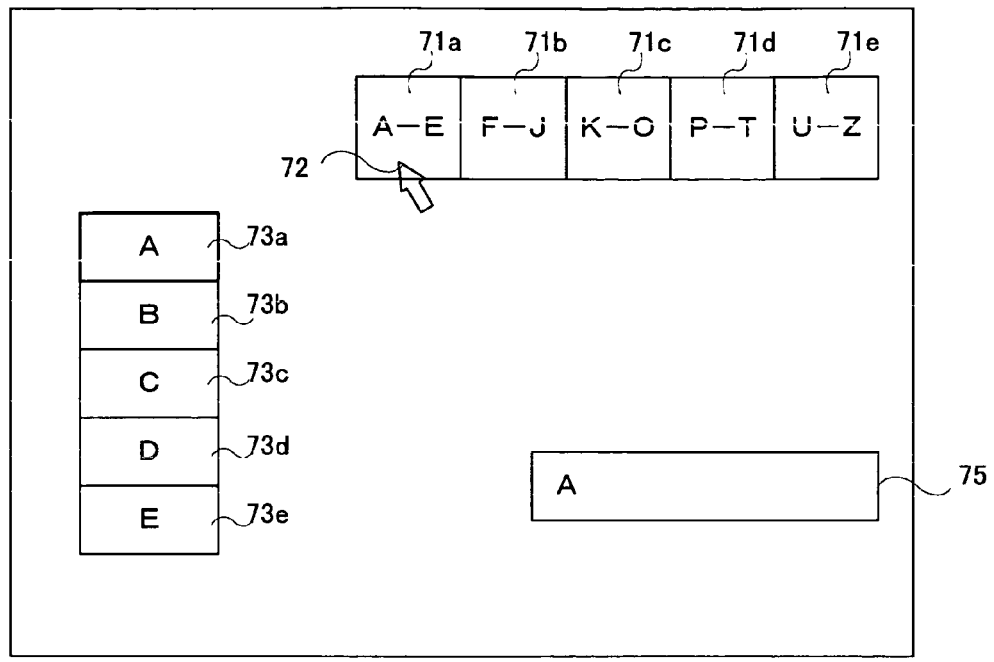
FIG. 24 shows a game image in another example of the first modified example.

In the first modified example, a plurality of objects arranged in a ring are replaced. Alternatively, for example, as shown in FIG. 24, a plurality of objects arranged linearly may be replaced. In the case shown in FIG. 24 like the first modified example, the positions of the candidate letter images 73a through 73e can be controlled using the candidate letter group data 640 representing the array of letters. For example, the game apparatus 3 displays the candidate letter image, corresponding to the letter stored at the beginning of the array, to the top and displays the other letters to be arranged downward therefrom. In this manner, the game image shown in FIG. 24 is displayed In this case, the replacement can be performed in substantially the same manner as in the first modified example.

In the first modified example, a plurality of objects (candidate letter images) as the replacement targets are displayed at the same time. In other modified examples, only one object as the replacement target may be displayed. FIG. 25 shows a game image in another example of the first modified example. In FIG. 25, only the image surrounded by the frame 74 is displayed among the candidate letter images as the replacement targets. The example shown in FIG. 25 is substantially the same as that shown in the first modified example except that the candidate letter images which are not surrounded by the frame 74 are not displayed. Like in the first modified example, the candidate letter image surrounded by the frame 74 is replaced in accordance with the inclination of the controller 7. In the example shown in FIG. 25, a candidate letter image 73a is replaced with another candidate letter image in accordance with the inclination of the controller 7.

The first modified example is also applicable for selecting an item from a menu image. Specifically, the game apparatus 3 displays a plurality of images representing different types of items (for example, weapon, protecting tool, etc.) instead of the candidate letter group images. When one of the images is selected by the cursor 72, the game apparatus 3 displays images representing the items belonging to the type represented by the selected image, instead of the candidate letter images. For example, when an image representing "weapon" is selected by the cursor 72, animate representing a "sword" and an image representing a "spear" are displayed. The player can replace the images representing the "sword" and the "spear" by rotating the controller 7, and thus can select a desired item.

Second Modified Example

In a second modified example, the present invention is applied for displaying a menu image which shows the order of characters in a marching procession. FIG. 26 shows an exemplary game image shown in the second modified example. The game image shows the order of four characters A through D appearing in a game and an item carried by each character. In the game shown in FIG. 26, the four characters are in a marching procession. A table 76 which associates the characters and the position of each character in the marching procession is displayed on the screen. The table 76 also associates the characters and items carried by each character (weapon or protecting tool). A cursor 77 moving in accordance with the indicated position by the controller 7 is also displayed on the screen.

In the second modified example, the objects to be the replacement targets are the cells in the table 76 which have numerals indicating the positions of the respective characters in the marching procession. The player selects a plurality of cells, among these cells, as the replacement targets. In this game, the player selects the cells as the replacement targets one by one. Specifically, the player moves the cursor 77 to the position of the cell as the replacement target, and presses a predetermined selection button (for example, the A button 32i) while the cell is indicated by the cursor 77. In response to the selection button being pressed, the game apparatus 3 selects the cell, which is indicated by the cursor 77 when the button is pressed, as the replacement target. In the second modified example, the cell selected as the replacement target is surrounded by a thick line. The player repeats the operation of moving the cursor 77 and selecting a cell as a replacement target a plurality of times. Thus, a plurality of cells are selected as the replacement targets. In the state shown in FIG. 26, the cell representing the position of character A (the cell having "1") and the cell representing the position of character C (the cell having "3") are selected.

When a plurality of cells are selected, the player changes the inclination of the controller 7. Then, the contents of the selected cells are replaced. Namely, the game apparatus 3 replaces the contents of the selected cells in accordance with the inclination of the controller 7. For example, in the state shown in FIG. 26, when the inclination of the controller 7 is changed, the game apparatus 3 replaces the cell representing the position of character A and the cell representing the position of character C with each other. As a result, in the post-replacement table 76 shown in FIG. 27, the cell representing the position of character A has "3" and the cell representing the position of character C has "1". As a result, the order of the marching procession is changed such that character C is at the first position and character A is at the third position.

Figure 28:
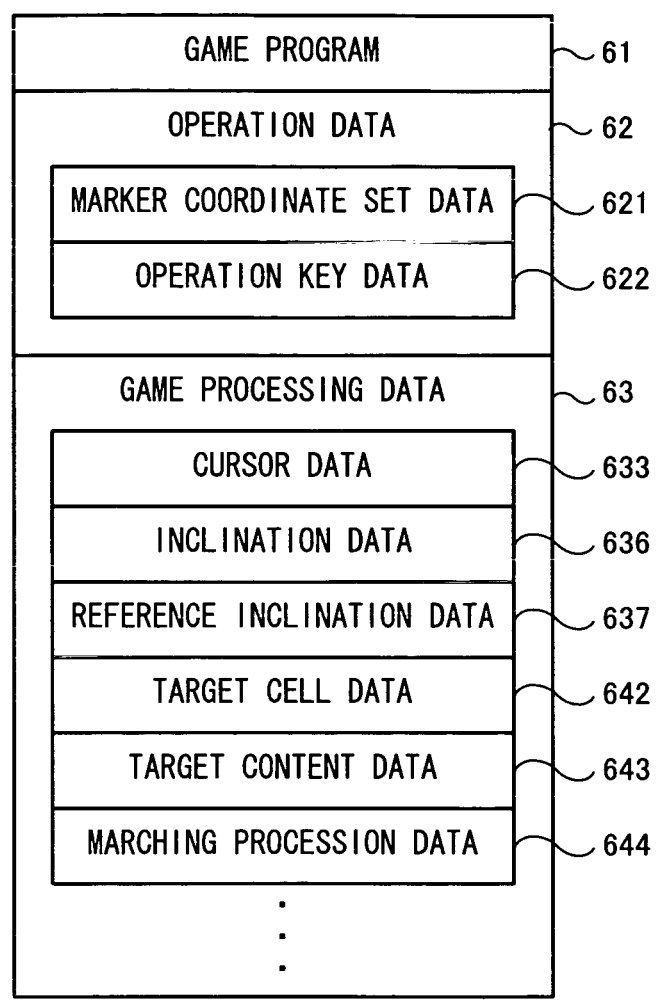
FIG. 28 shows main data stored on the main memory 13 of the game apparatus 3 in the second modified example.

FIG. 28 shows main data stored on the main memory 13 of the game apparatus 3 in the second modified example. As shown in FIG. 28, the main memory 13 has stored thereon a game program 61, operation data 62, game processing data 63 and the like. In FIG. 28, identical data to that described with reference to FIG. 12 in the above-described embodiment will bear identical reference numeral thereto, and detailed descriptions thereof will be omitted. Hereinafter, with reference to FIG. 28, mainly the differences from the data shown in FIG. 12 will be described.

In the second modified example, the game processing data 63 includes cursor data 633, inclination data 636, reference inclination data 637, target cell data 642, target content data 643, and marching procession data 644. The cursor data 633, the inclination data 636, the reference inclination data 637 are substantially the same as those of the above-described embodiment.

The target cell data 642 represents the cell which is there placement target among the cells in the table 76. The target cell data 642 is stored in the form of an array like the candidate letter group data 640 in the first modified example. The cell which is first selected as the replacement target is stored at the beginning of the array, and the other cells are stored at the subsequent positions in the array in the order of being selected. Referring to FIG. 26, in the case where the cell representing the "position in the marching procession of character A" is first selected and then the cell representing the "position in the marching procession of character C" is selected, the target cell data 642 represents "'the position in the marching procession of character A', 'the position in the marching procession of character C'".

The target content data 643 represents the content of the cell which is the replacement target (i.e., the position in the marching procession shown in the cell). The target content data 643 is stored in the form of an array like the target cell data 642. Data representing the content of the cell which is first selected as the replacement target is stored at the beginning of the array, and data representing the contents of the other cells are stored at the subsequent positions in the array in the order of being selected. Referring to FIG. 26, in the case where the cell representing the "position in the marching procession of character A" is first selected and then the cell representing the "position in the marching procession of character C" is selected, the target content data 643 represents: "'1', '3'".

The marching procession data 644 represents the positions of the four characters in the marching procession. Namely, the marching procession data 644 represents the contents of the two left columns of the table 76 shown in FIG. 26. The game apparatus 3 displays the table 76 in accordance with the contents of the marching procession data 644.

Figure 29:
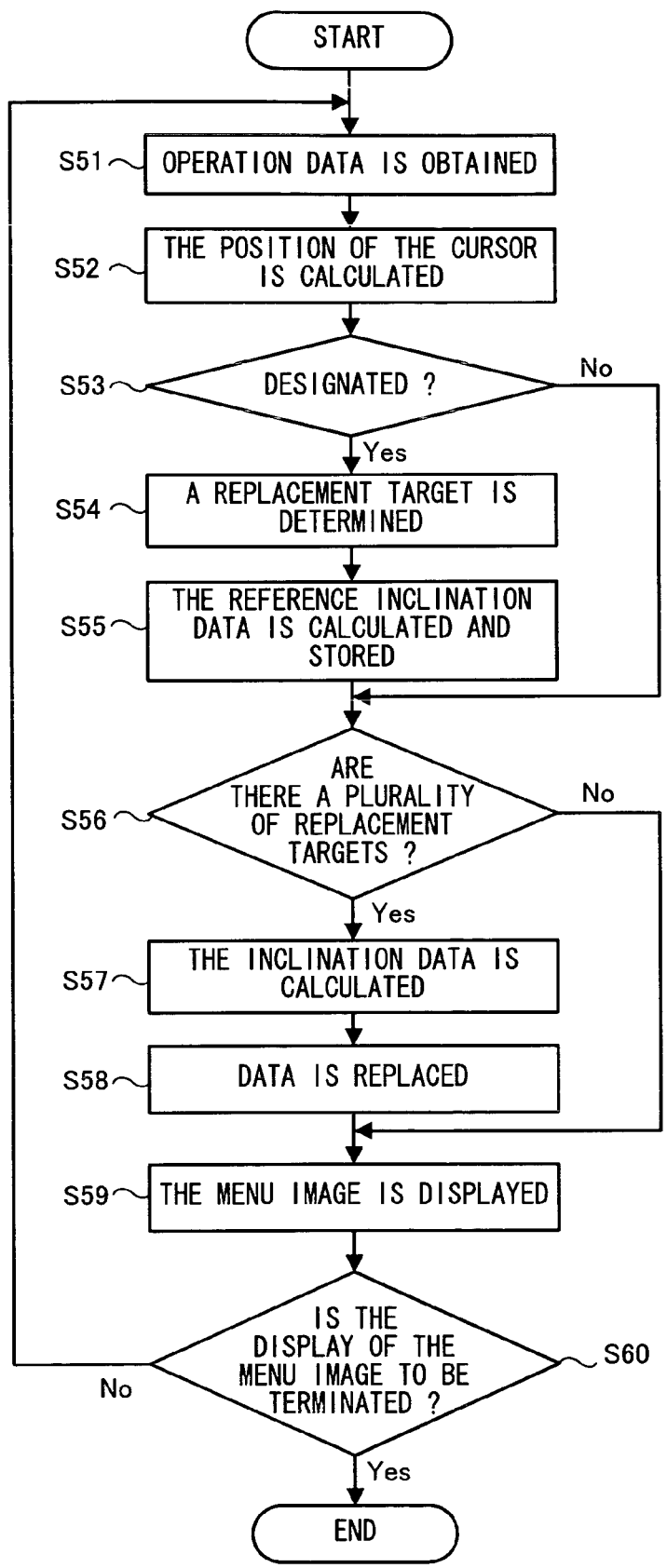
FIG. 29 is a main flowchart illustrating a flow of processing executed by the game apparatus 3 in the second modified example.

Next, with reference to FIG. 29, processing executed by the game apparatus 3 in the second modified example will be described in detail. FIG. 29 is a main flowchart illustrating a flow of processing executed by the game apparatus 3 in the second modified example. The processing of the flowchart shown in FIG. 29 is started when, for example, a predetermined condition is fulfilled during the game (e.g., when the player issues an instruction to change the order of the characters in the marching procession). Before the processing shown in FIG. 29 is started, the target cell data 642 and the target content data 643 stored on the main memory 13 are emptied.

First in step S51, the operation data 62 is obtained from the controller 7. Next in step S52, the position of the cursor 77 on the screen, i.e., the indicated position by the controller 7 is calculated. The processing in step S51 is substantially the same as that in step S3, and the processing in step S52 is substantially the same as that in step S11.

Next in step S53, the CPU 10 determines whether or not one of the cells in the table 76 has been designated. The determination is executed based on whether or not one of the cells in the table 76 is being pointed to by the cursor 77 and also whether or not a predetermined selection button (for example, the A button 32*i*) is pressed. Whether or not one of the cells in the table 76 is being pointed to by the cursor 77 is determined based on whether or not the position of the cursor 77 calculated in step S52 overlaps one of the cells in the table 76. Whether or not the predetermined selection button (for example, the A button 32*i*) is pressed is determined in substantially the same manner as that in step S38 by referring to the operation key data 622 stored on the main memory 13. When it is determined in step S53 that one of the cells in the table 76 has been designated, processing in step S54 is executed. When it is determined in step S53 that none of the cells in the table 76 has been designated, the processing in steps S54 and S55 is skipped and processing in step S56 is executed.

In step S54, the cell which is determined to be designated in step S53 is determined as a replacement target. The CPU 10 adds data representing the designated cell (for example, data representing the "position in the marching procession of character A") at the end of the array represented by the target cell data 642. The CPU 10 also adds data representing the content in the designated cell at the end of the array represented by the target content data 643. By the processing in step S54, an object (cell) is newly selected as a replacement target.

In step S55, the reference inclination data 637 is calculated and stored on the main memory 13. The processing in step S55 is substantially the same as that in step S15.

In step S56, it is determined whether or not a plurality of replacement targets have been determined. The determination is executed by referring to the number of pieces of data stored in the array of the target cell data 642 or the target content data 643. When the number is 0 or 1, the determination result in step S56 is negative. When the number is 2 or greater, the determination result in step S56 is positive. When the determination result in step S56 is positive, processing in step S57. By contrast, when the determination result in step S56 is negative, the processing in steps S57 and S58 is skipped and processing in step S59 is executed.

In step S57, data on the inclination vector V' representing the current inclination of the controller 7 (i.e., the inclination data 636) is calculated. The processing in step S57 is substantially the same as that in step S22.

Next in step S58, the contents of the cells selected as the replacement targets are replaced. The CPU 10 replaces the positions of the data in the array represented by the target content data 643. In the second modified example, the contents are replaced based on the following rule. In one cycle of replacement processing, data stored at the i'th position (i is an integer of 2 or greater) of the array before there placement is stored at the (i−1)th position of the array, and data stored at the beginning of the array before the replacement is stored at the end of the array. In step S58, the CPU 10 executes such replacement processing by a number of cycles corresponding to the inclination of the controller 7. For example, the CPU 10 executes one cycle of replacement processing each time the rotation angle calculated by the processing in steps S22 through S25 increases by 30°. In other modified examples, the contents may be replaced in the opposite manner to the above replacement processing each time the rotation angle decreases by 30°. Thus, the positions of the data stored in the array represented by the target content data 643 are replaced.

In step S58, the CPU 10 replaces the contents of the table 76 referring to the target content data 643 and the target cell data 642 after the replacement processing is executed. Specifically, the CPU 10 associates data of the cell stored at the j'th position (j is an integer of 1 or greater) of the array represented by the target cell data 642 with the data of the cell stored at the j'th position of the array represented by the target content data 643, and updates the contents of the marching procession data 644 in accordance with the association. For example, in the case where the data representing the "position in the marching procession of character A" is stored at the beginning of the array represented by the target cell data 642 and data representing "3" is stored at the beginning of the array represented by the target content data 643, the contents of the marching procession data 644 is updated such that the character A is located at the third position of the marching procession.

The processing in step S58 allows the game apparatus 3 to replace any plurality of objects (cells). The number of cells as the replacement targets may be any number which is 2 or greater.

In step S59, a menu image showing the items carried by the characters is displayed on the monitor 2. The contents of the table 76 displayed at this point are generated in accordance with the contents of the marching procession data 644 stored on the main memory 13.

Next in step S60, it is determined whether or not to terminate the display of the menu image. For example, the CPU 10 terminates the display when the player issues an instruction to terminate the display of the menu image. When the determination result in step S60 is negative, the processing is returned to step S51 and the processing in steps S51 through S60 is repeated until it is determined that the display of the menu image is to be terminated. By contrast, when the determination result in step S60 is positive, the CPU 10 terminates the processing shown in FIG. 29. The game processing in the second modified example is executed as described so far by the game apparatus 3.

In the second modified example, the cells representing the weapons and the cells representing the protecting tools may be or may not be replaced in the same manner as the cells of the marching procession.

As described in the second modified example, according to the present invention, the player may select the objects as the replacement targets one by one. This allows the player to replace data more freely. The objects as the replacement targets may be selected by changing the indicated position by the controller 7. In this case, the maneuverability of the replacement processing is improved.

Third Modified Example

Figure 30:
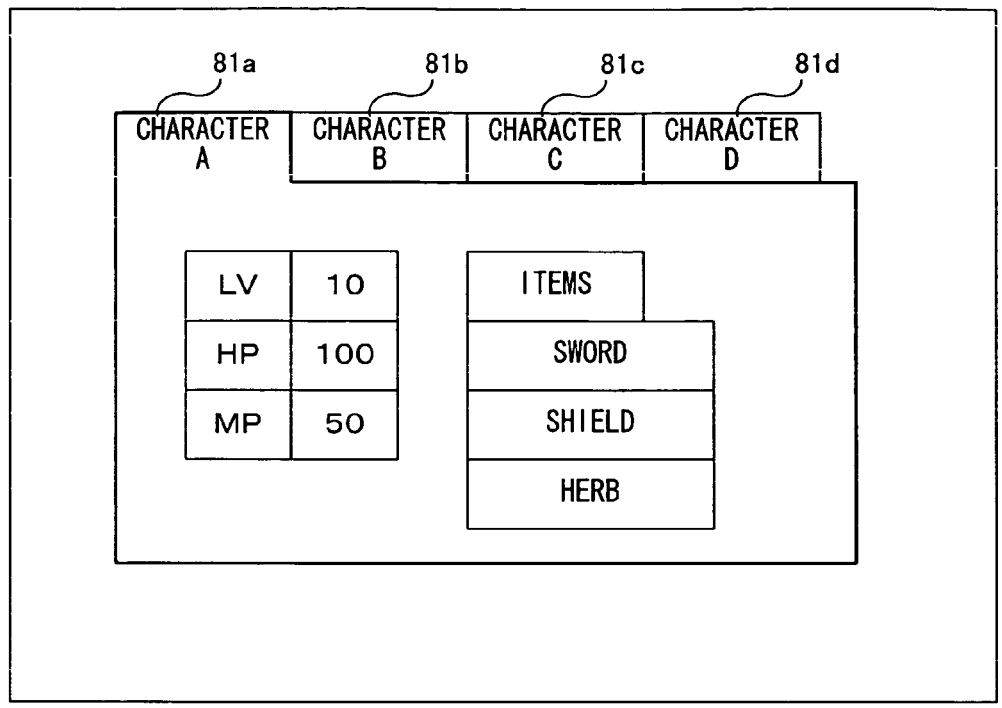
FIG. 30 shows an exemplary game image in a third modified example.

In a third modified example, the present invention is applied for displaying a menu image which shows the states of characters. FIG. 30 shows an exemplary game image shown in the third modified example. The game image shows the states of four characters A through D appearing in a game. The game image includes four windows 81a through 81d. Each window includes information on the states of the corresponding character, i.e., the level, the hit point (HP) and the magic point (MP) of the character, and items carried by the character. Since the four windows 81a through 81d are displayed in an overlapping manner, only the contents of the front most window (the window 81a in FIG. 30) are displayed, and the contents of the other windows are not displayed. Regarding the other windows 81b through 81d, only the tabs thereof are displayed. Each tab has the name of the character or the like written thereon.

Figure 31:
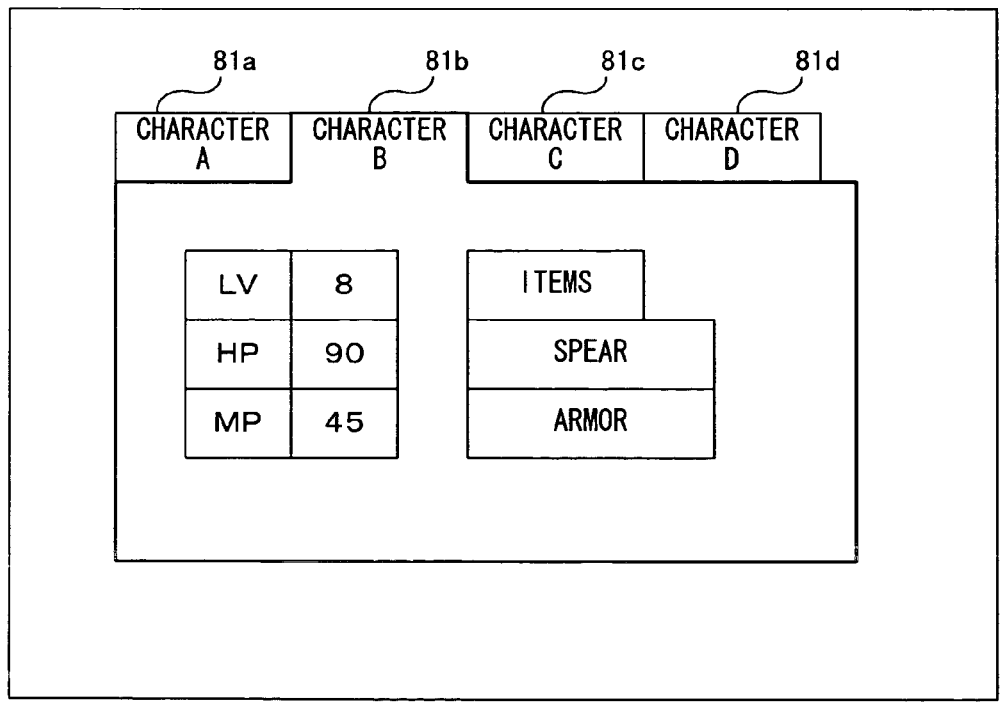
FIG. 31 shows a game image after the inclination of the controller 7 is changed from the state shown in FIG. 30.

In the state where the menu image is displayed as in FIG. 30, the player can replace the window displayed at the front most position by changing the inclination of the controller 7. Namely, the game apparatus 3 replaces the window displayed at the front most position in accordance with the inclination of the controller 7. FIG. 31 shows that the window 81b is displayed at the front most position as a result of the inclination of the controller 7 being changed from the state shown in FIG. 30. In FIG. 31, the front most window has been changed from the window 81a to the window 81b. In the third modified example, the window fully displayed can be replaced in accordance with the inclination of the controller 7. As shown in the third modified example, the present invention is applicable for replacing positions in the depth direction of the screen.

In order to determine the window to be displayed at the front most position, any method which makes a determination based on the inclination of the controller 7 can be used. For example, determination may be made based on the angle difference between the reference inclination vector and the inclination vector as in the above-described embodiment, or based only on the inclination vector without using the reference inclination vector as in the first modified example.

In the third modified example, the window displayed at the front most position may be managed, for example, as follows. Depth data representing the position of each window in the depth direction with respect to the screen is associated with the window. The window is displayed based on such data. According to this method, the positions of the windows in the depth direction can be replaced by changing the depth data associated with the windows.

As described in the embodiment and the first through third modified examples, according to the present invention, the objects displayed on the screen can be replaced in various manners by the operation of changing the inclination of the controller 7.

In the above-described embodiment, data on the vector in the virtual X'-Y'-Z' coordinate system is used as data representing the inclination of the controller 7 (inclination data) Alternatively, any data which changes in accordance with the inclination of the controller 7 is usable as the inclination data.

For example, a vector connecting the marker coordinate sets (the vector v shown in FIG. 15) may be used as the inclination data. In this case, the objects are replaced based on such inclination data.

In the above-described embodiment, the game apparatus 3 obtains the marker coordinate set data as the operation data from the controller 7. The operation data obtained by the game apparatus 3 from the controller 7 is not limited to the marker coordinate set data. For example, the operation data may be (a) data on the taken image, (b) data representing the direction connecting the positions of two marker coordinate sets, or (c) inclination data mentioned above. When (a) the data on the taken image is obtained from the controller 7, the game apparatus 3 needs to execute the processing of calculating a marker coordinate set from the taken image when the game apparatus 3 obtains (b) the data representing the direction connecting the positions of two marker coordinate sets, the controller 7 needs to execute the processing of calculating the corresponding vector. The game apparatus 3 does not need to execute such processing. The "data representing the direction" may be represented as a vector such as the vector v shown in FIG. 15, or represented as an angle (°) When the game apparatus 3 obtains (c) the inclination data, the controller 7 needs to execute the processing of calculating the inclination data from the taken image (step S22). The game apparatus 3 does not need to execute such processing.

In the above-described embodiment, the game apparatus 3 calculates the indicated position by the controller 7 based on the marker coordinate set data obtained from the controller 7 as the operation data. The method for calculating the indicated position by the controller 7 is not limited to this. When the game apparatus 3 calculates the indicated position by the controller 7, for example, as in the above embodiment, the operation data may be (a) data on the taken image or (d) data representing the position of the imaging target in the taken image. The data representing the position of the imaging target in the taken image ((d)) may be, for example, data representing the intermediate point between two marker coordinate sets described in the above embodiment. The reason is that where the two markers 8a and 8b are considered as one imaging target, the position of the intermediate point is considered as the position of the imaging target. When (a) the data on the taken image is obtained from the controller 7, the game apparatus 3 needs to execute the processing of calculating the position of the imaging target (e.g., the position of the intermediate point) from the taken image.

As described above, the present invention is applicable to, for example, a game apparatus or a game program for the purpose of, for example, allowing the user to perform a novel operation using a hand-held input device.

While the invention has been described in detail, the foregoing description is in all aspects illustrative and not restrictive. It is understood that numerous other modifications and variations can be devised without departing from the scope of the invention.

What is claimed is:

1. An information processing apparatus for obtaining operation data from an input device, including an imaging device for taking an image of an imaging target, and at least one operation key which can be pressed, and displaying a result of processing executed in accordance with the operation data on a screen of a display device, wherein the operation data includes first data, which is at least one of data on a taken image taken by the imaging device, data representing predetermined two positions in the imaging target in the taken image, data representing a direction connecting the two positions, and inclination data representing an inclination of the input device which is calculated based on the direction, and the second data which indicates whether or not the operation key is pressed, the information processing apparatus comprising:

a processor;

a memory coupled to said processor, said memory storing instructions that, when executed by said processor, control said processor to:

sequentially obtain the operation data;

sequentially calculate or obtain the inclination data representing the inclination of the input device from the first data included in the operation data;

sequentially calculate an indicated position on the screen indicated by the input device from the first data included in the operation data;

determine whether or not the operation key is pressed based on the second data included in the operation data;

set a plurality of objects as operation targets based on the indicated position at the timing when the operation key is pressed;

store, as a reference inclination, the inclination of the input device at the timing when the operation key is pressed, and delete the reference inclination at the timing when the operation key is released;

sequentially calculate a change amount in the inclination which is a difference between the sequentially calculated or obtained inclination data and the reference inclination while the operation key continues to be pressed;

rotate, while the operation key continues to be pressed, positions of the plurality of objects as the operation targets about a center defined based on the positions of the plurality of objects, in a direction which corresponds to the change amount in the inclination and by an amount which corresponds to the change amount in the inclination such that one of the plurality of objects, is replaced with another of the plurality of objects, and display the results; and cancel the setting of the operation targets at the timing when the operation key is released.

2. An information processing apparatus according to claim 1, wherein a plurality of objects included in a predetermined area including the indicated position at the timing when the operation key is pressed are set as the operation targets.

3. An information processing apparatus according to claim 1, wherein:

a plurality of object group images representing an object group including a plurality of objects are displayed on the screen; and it is determined whether or not one of the plurality of object group images overlaps the indicated position at the timing when the operation key is pressed, and the plurality of objects corresponding to the object group image overlapping the indicated position are set as the operation targets.

4. An information processing apparatus according to claim 1, wherein:

it is determined whether or not one of the plurality of objects displayed on the screen overlaps the indicated position at the timing when the operation key is pressed, and the object overlapping the indicated position and one or more objects adjacent to the object overlapping the indicated position are set as the operation targets.

5. An information processing apparatus according to claim 1, wherein display positions of the plurality of objects are replaced with each other by rotating the plurality of objects around an axis at a center of the display positions thereof.

6. An information processing apparatus according to claim 1, wherein:

display positions of the plurality of objects are replaced in a circulating manner; and the replacement is executed by a number of times corresponding to the change amount in the inclination.

7. An apparatus for obtaining operation data from an input device, including an imaging device for taking an image of an imaging target and at least one operation key which can be pressed, and executing processing executed in accordance with the operation data, wherein the operation data includes first data, which is at least one of data on a taken image taken by the imaging device, data representing predetermined two positions in the imaging target in the taken image, data representing a vector connecting the two positions, and inclination data representing an inclination of the input device which is calculated based on the vector, and second data which indicates whether or not the operation key is pressed, the apparatus comprising:

a processor;

a memory coupled to said processor, said memory storing instructions that, when executed by said processor, control said processor to:

sequentially obtain the operation data;

sequentially calculate or obtain the inclination data representing the inclination of the input device from the first data included in the operation data;

sequentially calculate an indicated position on a screen indicated by the input device from the first data included in the operation data;

determine whether or not the operation key is pressed based on the second data included in the operation data;

set, as operation targets, puzzle elements located in a predetermined area including a position in a virtual space corresponding to the indicated position at the timing when the operation key is pressed, among a plurality of puzzle elements located in the virtual space and classified into a plurality of types;

store, as a reference inclination, the inclination of the input device at the timing when the operation key is pressed, and delete the reference inclination at the timing when the operation key is released;

sequentially calculate a change amount in the inclination which is a difference between the sequentially calculated or obtained inclination data and the reference inclination while the operation key continues to be pressed;

rotate, while the operation key continues to be pressed, the puzzle elements as the operation targets about a center defined based on positions of the puzzle elements in a direction which corresponds to the inclination of the input device and by an amount which corresponds to the change amount in the inclination;

approximate the change amount in the inclination at the timing when the operation key is released to a rotation amount when positions of the puzzle elements as the operation targets are replaced in a circulating manner;

replace the positions of the puzzle elements as the operation targets in a circulating manner by rotating the puzzle elements by the approximated rotation amount;

when at least a predetermined number of puzzle elements classified into an identical group are arranged in a line in the virtual space as a result of the positions of the puzzle elements being replaced, delete the puzzle elements arranged in the line; and sequentially display an image of the game virtual space including the puzzle elements.

8. A non-transitory computer-readable storage medium having stored thereon an information processing program executable by a computer of an information processing apparatus for obtaining operation data from an input device, including an imaging device for taking an image of an imaging target and at least one operation key which can be pressed, and displaying a result of processing executed in accordance with the operation data on a screen of a display device, wherein the operation data includes first data, which is at least one of data on a taken image taken by the imaging device, data representing predetermined two positions in the imaging target in the taken image, data representing a direction connecting the two positions, and inclination data representing an inclination of the input device which is calculated based on the direction, and second data which indicates whether or not the operation key is pressed, the information processing program causing the computer to perform:

sequential obtaining of the operation data;

sequential calculating or obtaining of the inclination data representing the inclination of the input device from the first data included in the operation data;

sequential calculating of an indicated position on the screen indicated by the input device from the first data included in the operation data;

determining whether or not the operation key is pressed based on the second data included in the operation data;

setting a plurality of objects as operation targets based on the indicated position at the timing when the operation key is pressed;

storing, as a reference inclination, the inclination of the input device at the timing when the operation key is pressed, and deleting the reference inclination at the timing when the operation key is released;

sequential calculating of a change amount in the inclination which is a difference between the sequentially calculated or obtained inclination data and the reference inclination while the operation key continues to be pressed;

rotating, while the operation key continues to be pressed, positions of the plurality of objects as the operation targets about a center defined based on positions of the plurality of objects, in a direction which corresponds to the change amount in the inclination and by an amount which corresponds to the change amount in the inclination such that one of the plurality of objects is replaced with another of the plurality of objects, and displaying the result; and cancelling the setting of the operation targets at the timing when the operation key is released.

9. A non-transitory storage medium according to claim 8, wherein a plurality of objects included in a predetermined area including the indicated position, at the timing when the operation key is pressed, are set by the computer as the operation targets.

10. A non-transitory storage medium according to claim 8, wherein:

a plurality of object group images representing an object group including a plurality of objects are displayed on the screen; and the computer determines whether or not one of the plurality of object group images overlaps the indicated position at the timing when the operation key is pressed, and sets as the operation targets the plurality of objects corresponding to the object group image overlapping the indicated position.

11. A non-transitory storage medium according to claim 8, wherein:

the computer determines whether or not one of the plurality of objects displayed on the screen overlaps the indicated position at the timing when the operation key is pressed, and sets as the operation targets the object overlapping the indicated position and one or more objects adjacent to the object overlapping the indicated position.

12. A non-transitory storage medium according to claim 8, wherein the computer replaces display positions of the plurality of objects with each other by rotating the plurality of objects around an axis at a center of the display positions thereof.

13. A non-transitory storage medium according to claim 8, wherein:

the computer replaces display positions of the plurality of objects in a circulating manner; and the replacement is executed by a number of times corresponding to the change amount in the inclination.

14. A non-transitory computer-readable storage medium having stored thereon a program executable by a computer of a game apparatus for obtaining operation data from an input device, including an imaging device for taking an image of an imaging target and at least one operation key which can be pressed, and executing processing executed in accordance with the operation data, wherein the operation data includes first data, which is at least one of data on a taken image taken by the imaging device, data representing predetermined two positions in the imaging target in the taken image, data representing a vector connecting the two positions, and inclination data representing an inclination of the input device which is calculated based on the vector, and second data which indicates whether or not the operation key is pressed, the program causing the computer to execute:

sequentially obtaining the operation data;

sequentially calculating or obtaining the inclination data representing the inclination of the input device from the first data included in the operation data;

sequentially calculating an indicated position on a screen indicated by the input device from the first data included in the operation data;

determining whether or not the operation key is pressed based on the second data included in the operation data;

setting, as operation targets, puzzle elements located in a predetermined area including a position in a virtual space corresponding to the indicated position at the timing when the operation key is pressed, among a plurality of puzzle elements located in the virtual space and classified into a plurality of types;

storing, as a reference inclination, the inclination of the input device at the timing when the operation key is pressed, and deleting the reference inclination at the timing when the operation key is released in a memory of the apparatus;

sequentially calculating a change amount in the inclination which is a difference between the sequentially calculated or obtained inclination data and the reference inclination while the operation key continues to be pressed;

rotating, while the operation key continues to be pressed, the puzzle elements as the operation targets about a center defined based on positions of the puzzle elements in a direction which corresponds to the inclination of the input device and by an amount corresponding to the change amount in the inclination;

approximating the change amount in the inclination at the timing when the operation key is released to a rotation amount when positions of the puzzle elements as the operation targets are replaced in a circulating manner;

replacing the positions of the puzzle elements as the operation targets by rotating the puzzle elements by the approximated rotation amount;

when at least a predetermined number of puzzle elements classified into an identical group are arranged in a line in the virtual space as a result of the positions of the puzzle elements being replaced, deleting the puzzle elements arranged in the line; and sequentially displaying an image of the virtual space including the puzzle elements.

15. A system for obtaining operation data from an input device, including an imaging device for taking an image of an imaging target and at least one operation key which can be pressed, and displaying a result of game processing executed in accordance with the operation data on a screen of a display device, wherein the operation data includes first data, which is at least one of data on a taken image taken by the imaging device, data representing predetermined two positions in the imaging target in the taken image, data representing a direction connecting the two positions, and inclination data representing an inclination of the input device which is calculated based on the direction, and second data which indicates whether or not the operation key is pressed, the system comprising:

a processing system including a processing system;

a memory coupled to said processing system, said memory storing instructions that, when executed by said processing system, control said processing system to:

sequentially obtain the operation data;

sequentially calculate or obtain the inclination data representing the inclination of the input device from the first data included in the operation data;

sequentially calculate an indicated position on the screen indicated by the input device from the first data included in the operation data;

determine whether or not the operation key is pressed based on the second data included in the operation data;

set a plurality of objects as operation targets based on the indicated position at the timing when the operation key is pressed;

store, as a reference inclination, the inclination of the input device at the timing when the operation key is pressed, and delete the reference inclination at the timing when the operation key is released;

sequentially calculate a change amount in the inclination which is a difference between the sequentially calculated or obtained inclination data and the reference inclination while the operation key continues to be pressed;

rotate, while the operation key continues to be pressed, positions of the plurality of objects as the operation targets, about a center defined based on the positions of the plurality of objects, in a direction which corresponds to the change amount in the inclination and by an amount which corresponds to the change amount in the inclination such that one of the plurality of objects is replaced with another of the plurality of objects and display the result; and cancel the setting of the operation targets at the timing when the operation key is released.

16. A method for obtaining operation data from an input device, including an imaging device for taking an image of an imaging target and at least one operation key which can be pressed, and displaying a result of game processing executed in accordance with the operation data on a screen of a display device, wherein the operation data includes first data which is at least one of data on a taken image taken by the imaging device, data representing predetermined two positions in the imaging target in the taken image, data representing a direction connecting the two positions, and inclination data representing an inclination of the input device which is calculated based on the direction, and second data which indicates whether or not the operation key is pressed, the method comprising:

sequentially obtaining the operation data;

sequentially calculating or obtaining the inclination data representing the inclination of the input device from the first data included in the operation data;

sequentially calculating an indicated position on the screen indicated by the input device from the first data included in the operation data;

determining whether or not the operation key is pressed based on the second data included in the operation data;

setting a display of objects as operation targets based on the indicated position at the timing when the operation key is pressed;

storing, as a reference inclination, the inclination of the input device at the timing when the operation key is pressed, and deleting the reference inclination at the timing when the operation key is released;

sequentially calculating a change amount in the inclination which is a difference between the sequentially calculated or obtained inclination data and the reference inclination while the operation key continues to be pressed;

rotating, while the operation key continues to be pressed, positions of the plurality of objects as the operation targets, about a center defined based on the positions of the plurality of objects, in a direction which corresponds to the change amount in the inclination and by an amount which corresponds to the change amount in the inclination such that one of the plurality of objects is replaced with another of the plurality of objects, and displaying the result; and cancelling the setting of the operation targets at the timing when the operation key is released.

17. A system for obtaining operation data from an input device, including an imaging device for taking an image of an imaging target and at least one operation key which can be pressed, and executing game processing executed in accordance with the operation data, wherein the operation data includes first data, which is at least one of data on a taken image taken by the imaging device, data representing predetermined two positions in the imaging target in the taken image, data representing a vector connecting the two positions, and inclination data representing an inclination of the input device which is calculated based on the vector, and second data which indicates whether or not the operation key is pressed, the system comprising:

a processing system including one or more processors;

a memory coupled to said processing system, said memory storing instructions that, when executed by said processing system, control said processing system to:

sequentially obtain the operation data;

sequentially calculate or obtain the inclination data representing the inclination of the input device from the first data included in the operation data;

sequentially calculate an indicated position on a screen indicated by the input device from the first data included in the operation data;

determine whether or not the operation key is pressed based on the second data included in the operation data;

set, as operation targets, puzzle elements located in a predetermined area including a position in a virtual space corresponding to the indicated position at the timing when the operation key is pressed, among a plurality of puzzle elements located in the virtual space and classified into a plurality of types;

store, as a reference inclination, the inclination of the input device at the timing when the operation key is pressed, and delete the reference inclination when the operation key is released;

sequentially calculate a change amount in the inclination which is a difference between the sequentially calculated or obtained inclination data and the reference inclination while the operation continues to be pressed;

rotate, while the operation key continues to be pressed, the puzzle elements as the operation targets about a center defined based on positions of the puzzle elements in a direction which corresponds to the inclination of the input device and by an amount corresponding to the change amount in the inclination;

approximate the change amount in the inclination at the timing when the operation key is released to a rotation amount when positions of the puzzle elements as the operation targets are replaced in a circulating manner;

replace the positions of the puzzle elements as the operation targets in a circulating manner by rotating the puzzle elements by the approximated rotation amount;

when at least a predetermined number of puzzle elements classified into an identical group are arranged in a line in the virtual space as a result of the positions of the puzzle elements being replaced, delete the puzzle elements arranged in the line; and sequentially display an image of the virtual space including the puzzle elements.

18. A method for obtaining operation data from an input device, including an imaging device for taking an image of an imaging target and at least one operation key which can be pressed, and executing game processing executed in accordance with the operation data, wherein the operation data includes first data, which is at least one of data on a taken image taken by the imaging device, data representing predetermined two positions in the imaging target in the taken image, data representing a vector connecting the two positions, and inclination data representing an inclination of the input device which is calculated based on the vector, and second data which indicates whether or not the operation key is pressed, the method comprising:

sequentially obtaining the operation data;

sequentially calculating or obtaining the inclination data representing the inclination of the input device from the first data included in the operation data;

sequentially calculating an indicated position on a screen indicated by the input device from the first data included in the operation data;

determining whether or not the operation key is pressed based on the second data included in the operation data;

setting, as operation targets, puzzle elements located in a predetermined area including a position in a virtual space corresponding to the indicated position at the timing when the operation key is pressed, among a plurality of puzzle elements located in the virtual space and classified into a plurality of types;

storing, in a memory of the game apparatus, as a reference inclination, the inclination of the input device at the timing when the operation key is pressed, and deleting the reference inclination at the timing when the operation key is released;

sequentially calculating a change amount in the inclination which is a difference between the sequentially calculated or obtained inclination data and the reference inclination while the operation key continues to be pressed;

rotating, while the operation key continues to be pressed, the puzzle elements as the operation targets about a center defined based on positions of the puzzle elements in a direction which corresponds to the inclination of the input device and by an amount corresponding to the change amount in the inclination;

approximating the change amount in the inclination at the timing when the operation is released to a rotation amount when positions of the puzzle elements as the operation targets are replaced in a circulating manner;

replacing the positions of the puzzle elements as the operation targets by rotating the puzzle elements by the approximated rotation amount;

when at least a predetermined number of puzzle elements classified into an identical group are arranged in a line in the virtual space as a result of the positions of the puzzle elements being replaced, deleting the puzzle elements arranged in the line; and sequentially displaying an image of the virtual space including the puzzle elements.

* * * * *